United States Patent
Sakuma

(10) Patent No.: US 9,917,960 B2
(45) Date of Patent: Mar. 13, 2018

(54) IMAGE FORMING APPARATUS, MANAGEMENT APPARATUS, NON-TRANSITORY COMPUTER-READABLE STORAGE MEDIUM AND LOAD CONTROL METHOD

(71) Applicant: KONICA MINOLTA, INC., Chiyoda-ku, Tokyo (JP)

(72) Inventor: Keishi Sakuma, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/237,663

(22) Filed: Aug. 16, 2016

(65) Prior Publication Data

US 2017/0054860 A1 Feb. 23, 2017

(30) Foreign Application Priority Data

Aug. 18, 2015 (JP) ................................ 2015-160853

(51) Int. Cl.
*H04N 1/04* (2006.01)
*H04N 1/00* (2006.01)
(Continued)

(52) U.S. Cl.
CPC ....... *H04N 1/00344* (2013.01); *G06F 3/1204* (2013.01); *G06F 3/126* (2013.01); *G06F 3/1211* (2013.01); *G06F 3/1224* (2013.01); *G06F 3/1229* (2013.01); *G06F 3/1236* (2013.01); *G06F 3/1259* (2013.01); *G06F 3/1285* (2013.01); *H04L 43/08* (2013.01); *H04L 67/1002* (2013.01); *H04L 67/14* (2013.01);
(Continued)

(58) Field of Classification Search
CPC .......... H04N 1/00344; H04N 1/00204; H04N 1/0094
USPC ........................................ 358/1.15, 1.14, 1.9
See application file for complete search history.

(56) References Cited

U.S. PATENT DOCUMENTS

2002/0099831 A1* 7/2002 Tsunogai ................ H04L 67/14
709/227
2003/0182367 A1 9/2003 Ohara
(Continued)

FOREIGN PATENT DOCUMENTS

JP 2004-005394 A 1/2004

*Primary Examiner* — Houshang Safaipour
(74) *Attorney, Agent, or Firm* — Buchanan Ingersoll & Rooney PC

(57) ABSTRACT

Provided are an image forming apparatus, a management apparatus, a non-transitory computer-readable storage medium storing a load control program and a load control method. The image forming apparatus includes a controller that provides a job execution function and a server function. The controller defines a condition for restricting server connections from one or more client terminals, according to a status of job execution, and instructs a load balancing apparatus to perform load control to restrict the server connections based on the condition. The management apparatus includes a controller that sends a request from a client terminal to a server function, to one of image forming apparatuses. The controller obtains, from each image forming apparatus, information relating to a status of job execution, and performs load control to restrict server connections to each image forming apparatus, according to the status of job execution.

18 Claims, 20 Drawing Sheets

(51) Int. Cl.
*H04L 29/08* (2006.01)
*H04L 12/26* (2006.01)
*G06F 3/12* (2006.01)

(52) U.S. Cl.
CPC . *H04N 1/00204* (2013.01); *H04N 2201/0094* (2013.01)

(56) References Cited

U.S. PATENT DOCUMENTS

2005/0102400 A1* 5/2005 Nakahara ................ H04L 29/06
  709/225
2011/0313781 A1* 12/2011 Ho ......................... G06Q 30/02
  705/1.1

* cited by examiner

FIG. 7

| JOB TYPE | COLOR TYPE | IMAGE SIZE | AVERAGE CPU LOAD |
|---|---|---|---|
| PRINT | COLOR | A3 | 40% |
| | | A4 | 20% |
| | | A5 | 10% |
| | | ⋮ | ⋮ |
| | MONOCHROME | A3 | 10% |
| | | A4 | 5% |
| | | A5 | 3% |
| | | ⋮ | ⋮ |
| COPY | COLOR | A3 | 40% |
| | | A4 | 20% |
| | | A5 | 10% |
| | | ⋮ | ⋮ |
| | MONOCHROME | A3 | 10% |
| | | A4 | 5% |
| | | A5 | 3% |
| | | ⋮ | ⋮ |

FIG. 8

| NUMBER OF SERVER CONNECTIONS | AVERAGE CPU LOAD |
|---|---|
| 1 | 10% |
| 2 | 12% |
| 3 | 14% |
| 4 | 16% |
| 5 | 18% |
| 6 | 20% |
| 7 | 22% |
| 8 | 24% |
| 9 | 26% |
| 10 | 28% |
| 11 | 30% |
| 12 | 32% |
| 13 | 34% |
| 14 | 36% |
| 15 | 38% |
| 16 | 40% |
| 17 | 42% |
| ⋮ | ⋮ |

US 9,917,960 B2

IMAGE FORMING APPARATUS, MANAGEMENT APPARATUS, NON-TRANSITORY COMPUTER-READABLE STORAGE MEDIUM AND LOAD CONTROL METHOD

The entire disclosure of Japanese Patent Application No. 2015-160853 filed on Aug. 18, 2015 including description, claims, drawings, and abstract are incorporated herein by reference in its entirety.

TECHNICAL FIELD

The present invention is directed to image forming apparatuses, management apparatuses, non-transitory computer-readable storage media each storing a load control program, and load control methods. In particular, the present invention is directed to an image forming apparatus equipped with a server function, a management apparatus, a non-transitory computer-readable storage medium storing a load control program for reducing a processing load of the server function of the image forming apparatus, and a method of reducing a processing load of the server function of the image forming apparatus.

BACKGROUND

There is a certain type of image forming apparatus like a MFP (Multi-Functional Peripheral) that not only supports job execution functions to execute document-processing jobs (hereinafter, referred to as jobs) as basic functions, which include print functions, copy functions, scan functions, fax functions and others, but also supports server functions including Web server functions and/or file server functions. Such type of image forming apparatus is now coming on the market.

A consideration is given to such an image forming apparatus providing server functions, configured to execute both processing relating to the job execution functions and processing relating to the server functions on one and same processing unit. When access to use the server functions (referred to as server access or server connections) from client terminals is centralized on one image forming apparatus that is performing job execution, it increases a processing load of the server functions and can result in the following deterioration about the job execution which is processed together with the processing relating to the server function in parallel. That is, the increase of the processing load can degrade performance of the job execution. Further, the increase of the processing load can affect real-time processing relating to the job execution, including real-time control of mechanical parts of the image forming apparatus and real-time image processing, which can cause deterioration of reliability of the job execution. Therefore, there is a need in the image forming apparatus to control or reduce, during job execution, a processing load of the server function so that sufficient performance and reliability of the job execution can be secured.

DESCRIPTION OF THE RELATED ART

With regard to the above-described technology to control a processing load of the server functions, for example, Japanese Unexamined Patent Publication No. 2004-005394 (corresponding to US2003/0182367A1) discloses the following printer that has Web server functions and is configured to distribute a processing load of the Web server functions of the printer across other printers. When the printer receives, from a client device, a request to obtain Web page information, a Web server inside the printer prepares HTML data on the basis of information about image files stored in each of the other printers, and sends the HTML data to the client device. The information about the image files has been obtained in advance. The HTML data designates the other printers as image sources so as to cause the client device to obtain the image files from the other printers designated.

The above-described JP-A No. 2004-005394 discloses a method to distribute a processing load of server functions of a printer across other printers, by preparing data to designate the other printers as sources of image files containing images to be displayed on a Web page. In this method, even under the condition that server access from client terminals is centralized on one image forming apparatus, the similar load distribution is executed on plural image forming apparatuses. It results in an increase of a processing load on each image forming apparatus in proportion to an increase of the number of connections to the server function (the amount of server access), and it makes difficult to sufficiently secure the performance and reliability of job execution in each image forming apparatus.

SUMMARY

The present invention is directed to image forming apparatuses, management apparatuses, non-transitory computer-readable storage media each storing a load control program and load control methods, which can avoid at least deterioration of performance and reliability of job execution in an image forming apparatus.

An image forming apparatus reflecting one aspect of the present invention is capable of communicating with one or more client terminals and a load balancing apparatus through a network. The image forming apparatus comprises a network interface unit and a controller that provides a job execution function to execute a job and a server function to receive data from the network or output data to the network through the network interface unit. The controller defines a condition for restricting server connections from the one or more client terminals to use the server function, in accordance with a status of job execution, and instructs the load balancing apparatus to perform load control to restrict the server connections from the one or more client terminals on a basis of the condition defined.

A management apparatus reflecting one aspect of the present invention is capable of communicating through a network with one or more client terminals and a plurality of image forming apparatuses each providing a job execution function to execute a job and a server function to receive data from the network or output data to the network through a network interface unit of the each of the image forming apparatuses. The management apparatus comprises a network interface unit and a controller. The controller receives a request sent from the client terminal to the server function of one of the plurality of image forming apparatuses and sends the request to the one of the plurality of image forming apparatuses, through the network interface unit. The controller obtains, from each of the plurality of image forming apparatuses, information relating to a status of job execution of the each of the plurality of image forming apparatuses, and in accordance with the status of job execution of the each of the plurality of image forming apparatuses, performs load control to restrict server connections from the one or more client terminals to use the server function of each of the plurality of image forming apparatuses.

A non-transitory computer-readable storage medium reflecting one aspect of the present invention stores a load control program to be executed in an image forming apparatus. The image forming apparatus is capable of communicating with one or more client terminals and a load balancing apparatus through a network. The image forming apparatus provides a job execution function to execute a job and a server function to receive data from the network or output data to the network through a network interface unit. The load control program, when being executed by a processor of the image forming apparatus, causes the image forming apparatus to perform the following processing. The processing comprises: defining a condition for restricting server connections from the one or more client terminals to use the server function, in accordance with a status of job execution; and instructing the load balancing apparatus to perform load control to restrict the server connections from the one or more client terminals on a basis of the condition defined.

A non-transitory computer-readable storage medium reflecting one aspect of the present invention stores a load control program to be executed in a management apparatus. The management apparatus is capable of communicating through a network with one or more client terminals and a plurality of image forming apparatuses each providing a job execution function to execute a job and a server function to receive data from the network or output data to the network through a network interface unit of the each of the image forming apparatuses. The management apparatus receives a request sent from the client terminal to the server function of one of the plurality of image forming apparatuses and sends the request to the one of the plurality of image forming apparatuses. The load control program, when being executed by a processor of the management apparatus, causes the management apparatus to perform the following processing. The processing comprises: obtaining, from each of the plurality of image forming apparatuses, information relating to a status of job execution of the each of the plurality of image forming apparatuses; and in accordance with the status of job execution of the each of the plurality of image forming apparatuses, performing load control to restrict server connections from the one or more client terminals to use the server function of each of the plurality of image forming apparatuses.

A load control method reflecting one aspect of the present invention is a method to be used in a system including one or more client terminals, a load balancing apparatus and an image forming apparatuses being capable of communicating with each other through a network. The image forming apparatus provides a job execution function to execute a job and a server function to receive data from the network or output data to the network through a network interface unit. The method comprises: defining, by the image forming apparatus, a condition fur restricting server connections from the one or more client terminals to use the server function, in accordance with a status of job execution; and instructing, by the image forming apparatus, the load balancing apparatus to perform load control to restrict the server connections from the one or more client terminals on a basis of the condition defined.

A load control method reflecting one aspect of the present invention is a method to be used in a system including one or more client terminals, a management apparatus and a plurality of image forming apparatuses being capable of communicating with each other through a network. The plurality of image forming apparatuses each provides a job execution function to execute a job and a server function to receive data from the network or output data to the network through a network interface unit. The management apparatus receives a request sent from the client terminal to the server function of one of the plurality of image forming apparatuses and sends the request to the one of the plurality of image forming apparatuses. The method comprises: obtaining, by the management apparatus from each of the plurality of image forming apparatuses, information relating to a status of job execution of the each of the plurality of image forming apparatuses; and in accordance with the status of job execution in the each of the plurality of image forming apparatuses, performing by the management apparatus load control to restrict server connections from the one or more client terminals to use the server function of each of the plurality of image forming apparatuses.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 7 illustrates an example of a table according to Example 1, in which job types and respective processing loads are associated with each other;

FIG. 8 illustrates an example of a table according to Example 1, in which the amount of server access (the numbers of server connections) and respective processing loads are associated with each other;

DESCRIPTION OF THE PREFERRED EMBODIMENTS

Figure 1:
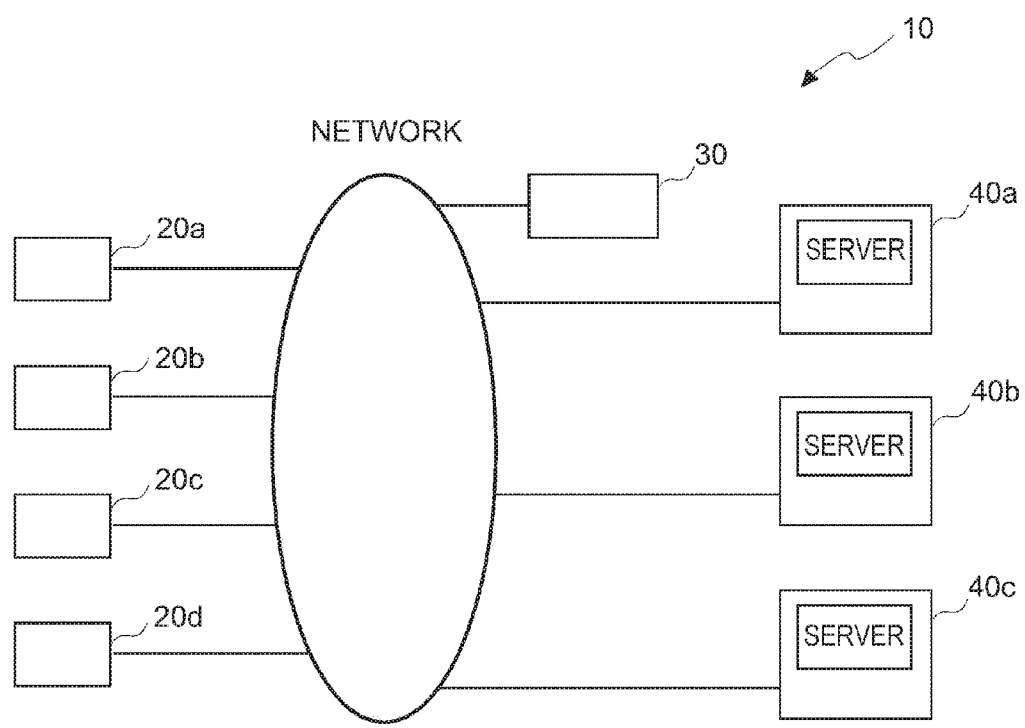
FIG. 1 is a schematic diagram of an example of a network system according to Example 1.

Hereinafter, an embodiment of the present invention will be described with reference to the drawings. However, the scope of the invention is not limited to the illustrated examples.

Image forming apparatuses, management apparatuses, non-transitory computer-readable storage media each storing a load control program, and load control methods, as embodiments of the present invention, can avoid deterioration of performance and reliability of job execution in an image forming apparatus, coming from a use of a server function of the image forming apparatus, for the following reasons.

One of the reasons is that an image forming apparatus which can provide a job execution function and a server function, is configured to perform the following processing. The image forming apparatus defines a condition for restricting server access server connections) from one or more client terminals to use the server function, in accordance with a status of job execution, and instructs a load balancing apparatus to perform load control to restrict the server access server connections) from the one or more client terminals on the basis of the condition defined. As a concrete example, the image forming apparatus which can provide a job execution function and a server function, may determine a processing load of a job in execution by referring to a first table, in which job types and respective processing are associated with each other, and define the number of allowable server connections that can be processed together with the job in parallel by referring to a second table, in which the numbers of server connections and respective processing loads are associated with each other. The image forming apparatus may further instruct the load balancing apparatus to perform the load control to restrict the server access (server connections) on the based on the number of allowable server connections.

Another reason is that a management apparatus that manages plural image forming apparatuses each providing a job execution function and a server function, is configured to perform the following processing. The management apparatus obtains, from each image forming apparatus, information relating to a status of job execution of the each image forming apparatus, and in accordance with the status of job execution of the each image forming apparatus, performs load control to restrict server access server connections) from one or more client terminals to use the server function of each image forming apparatus. As a concrete example, the management apparatus may obtain, from each image forming apparatus, apparatus information including a first table in which job types and respective processing loads are associated with each other, and a second table in which the numbers of server connections and respective processing loads are associated with each other. The management apparatus may further determine a processing load of a job in execution in each image forming apparatus, by referring to the first table; define the number of allowable server connections that can be processed together with the job in parallel in each image forming apparatus, by referring to the second table; and performs the load control to restrict the server access (server connections) based on the number of allowable server connections of each image forming apparatus.

As described in BACKGROUND, in an image forming apparatus which provides a server function additionally to a job execution function and is configured to execute both processing relating to the job execution functions and processing relating to the server functions, an occurrence of centralized access so as to use the server function from client terminals during job execution can make the following problem. It increases a processing load of the server function and can result in deterioration of performance and reliability of job execution to be processed together with the processing relating to the server function in the image forming apparatus.

To solve the problem, the processing load of the server function may be distributed across plural image forming apparatuses by using the technology disclosed in JPA No. 2004-005394. However, even if the processing load of the server function is distributed, the processing load of the server function in each of the image forming apparatuses increases in proportion to the number of server connections from client terminals. It still makes difficult to secure the performance and reliability of the job execution sufficiently in each of the image forming apparatuses.

In view of that, an embodiment of the present invention provides the following load control to restrict server access in a network system including at least an image forming apparatus that provides both a job execution function and a server function, where the job execution functions is a function to execute a job and the server function is a function to receive data from a network or output data to a network through a network interface unit. In the network system, a load balancing apparatus or a management apparatus connected to the image forming apparatus through a network, executes load control so as to restrict server access from one or more client terminals to the image forming apparatus on the basis of a status of job execution in the image forming apparatus.

As one example, in a network system including one or more client terminals, a load balancing apparatus and an image forming apparatus, the image forming apparatus as an embodiment of the present invention provides both a job execution function to execute a job and a server function to receive data from a network or output data to a network through a network interface unit. The image forming apparatus defines a condition for restricting server connections from the one or more client terminals to use the server function, in accordance with a status of job execution. For example, the forming apparatus may define the number of allowable server connections indicating the number of server connections to use the server function which can he processed together with the job in parallel on a common hardware resource. The image forming apparatus further instructs the load balancing apparatus connected with the image forming apparatus through a network, to perform load control to restrict the server connections from the one or more client terminals on the basis of the condition (the number of allowable server connections) defined.

As another example, in a network system including one or more client terminals, plural image forming apparatuses each providing a job execution function and a server function, and a management apparatus that receives a request sent from the client terminal to the server function and sends the request to one of the of image forming apparatuses, the management apparatus as an embodiment of the present invention is configured to perform the following processing. The management apparatus obtains, from each of the image forming apparatuses, information relating to a status of job execution of the each of the image forming apparatuses, and in accordance with the status of job execution of the each of the image forming apparatuses, performs load control to restrict server connections from one or more client terminals to use the server function of each of the image forming apparatuses.

As described above, in the embodiments, the load control to restrict server access to the image forming apparatus which is performing job execution is executed so as to control the processing load of the server function of the image forming apparatus to be a certain degree or less, during the job execution. Thereby, the performance of processing (like printing) of the image forming apparatus during job execution can be maintained at a certain degree or higher. Further, such control restricts an influence of the increased server load during job execution, onto the job execution, and the reliability of processing (like printing) of the image forming apparatus during the job execution can be sufficiently secured.

EXAMPLES

Example 1

Figure 2A:
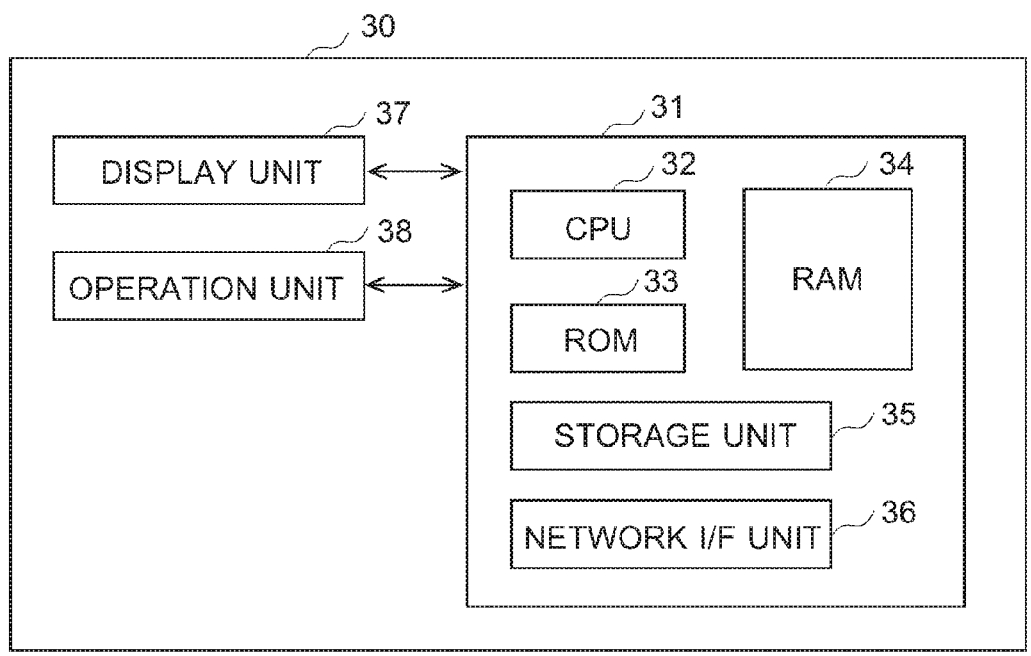
FIGS. 2A and 2B are block diagrams of an example of the structure of a load balancing apparatus according to Example 1.
Figure 2B:
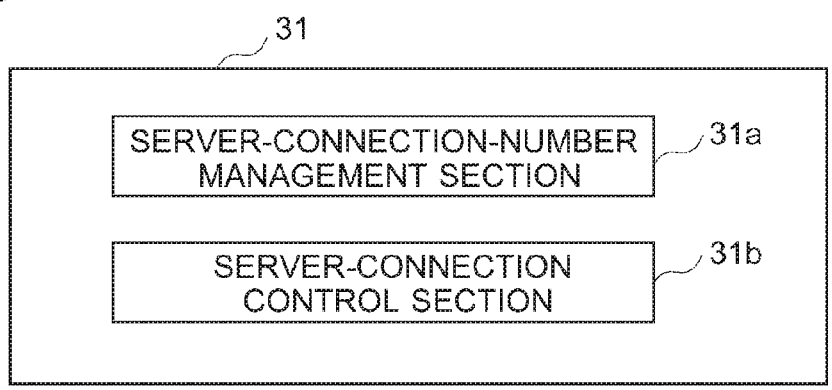
Figure 3A:
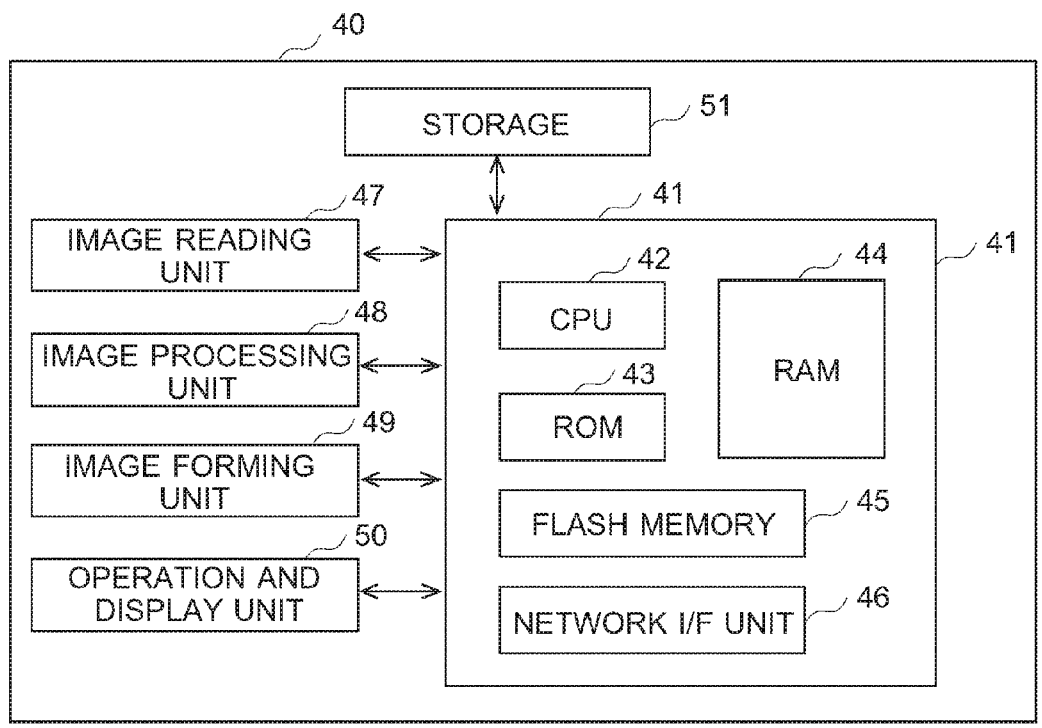
FIGS. 3A and 3B are block diagrams of an example of the structure of an image forming apparatus according to Example 1.
Figure 3B:
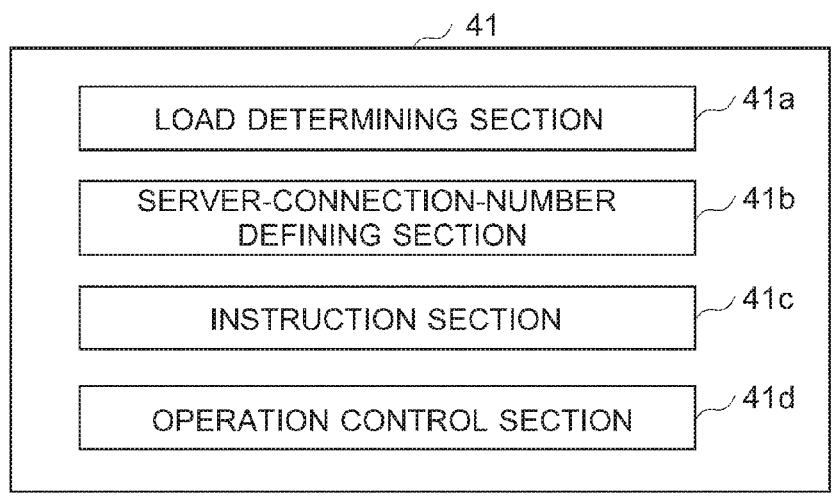
Figure 4:
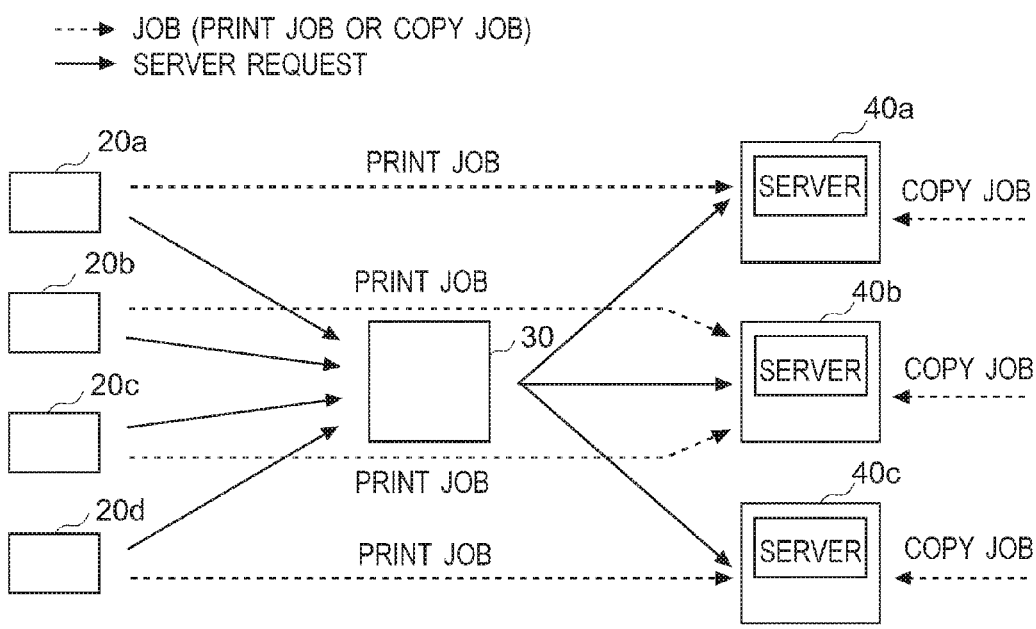
FIG. 4 is a schematic diagram of an example of processing to be performed in the network system including the image forming apparatuses according to Example 1.
Figure 5:
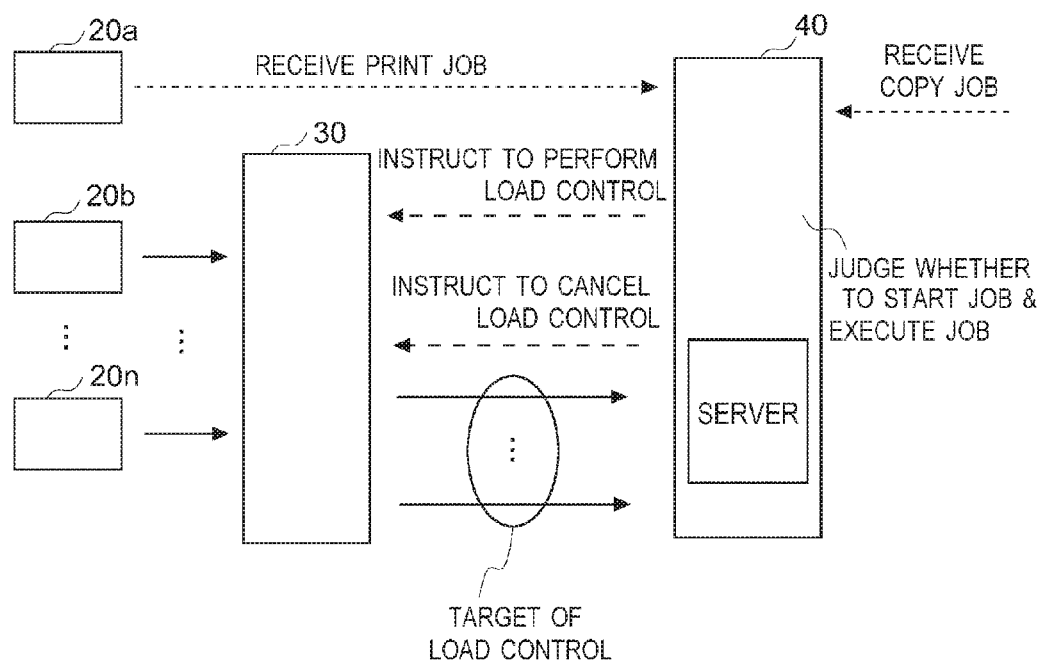
FIG. 5 is a schematic diagram of an example of load control to be performed in the network system including the image forming apparatus according to Example 1.
Figure 6:
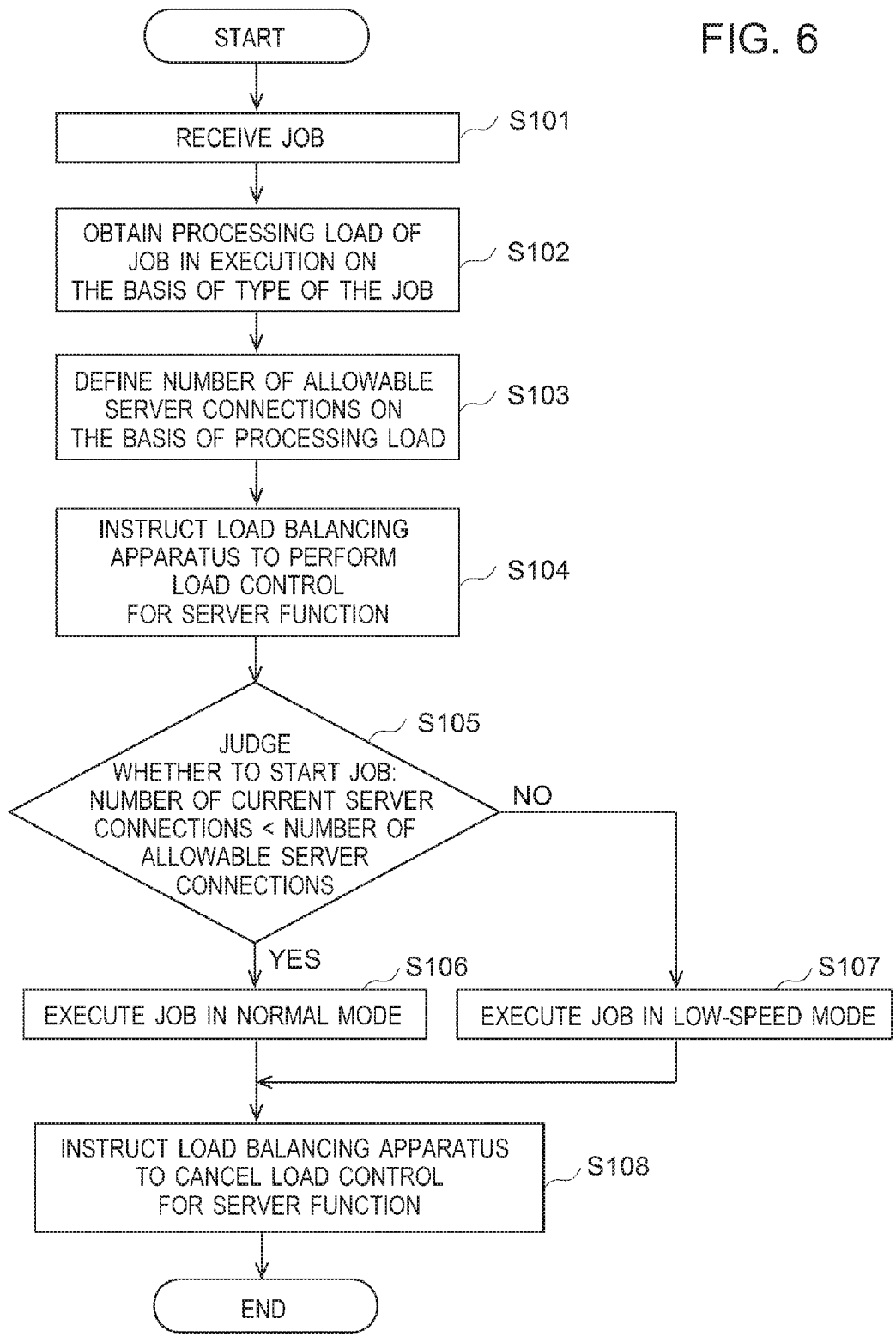
FIG. 6 is a flowchart of an example of operations of the image forming apparatus according to Example 1.

In order to describe in more detail the abovementioned embodiments of the present invention, a description will be given of an example of a network system, a non-transitory computer-readable storage medium storing a load control program and a load control method according to Example 1, with reference to FIG. 1 to FIG. 8. FIG. 1 is a schematic diagram of an example of a network system according to Example 1. FIGS. 2A and 2B are block diagrams of an example of the structure of a load balancing apparatus according to Example 1, and FIGS. 3A and 3B are block diagrams of an example of the structure of an image forming apparatus according to Example 1. FIG. 4 is a schematic diagram of an example of processing to be executed in the network system including the image forming apparatuses according to Example 1. FIG. 5 is a schematic diagram of an example of load control to be performed in the network system including the image forming apparatus according to Example 1. FIG. 6 is a flowchart of an example of operations of the image forming apparatus according to Example 1. FIG. 7 illustrates an example of a table in which job types and respective processing toads are associated with each other. FIG. 8 illustrates an example of a table in which the amount of server access (the numbers of server connections) and respective processing loads are associated with each other.

Network system 10 of the present example includes one or more client terminals 20 which use services offered by the system, load balancing apparatus 30 and image forming apparatuses 40 each providing a server function. These in the network system 10 are communicably connected to each other through a network, where examples of the network include a LAN (Local Area Network) and WAN (Wide Area Network) defined by specifications, such as Ethernet, Token Ring and MDT (Fiber-Distributed Data Interface).

In the present example, load control is executed on a system such that plural image forming apparatuses 40 can provide the same kind of services to plural client terminals 20 connected to the image forming apparatuses 40 via the network. As one example of the network system 10. FIG. 1 illustrates the network system 10 including client terminals 20a, 20b, 20c and 20d as the plural client terminals 20, and image forming apparatuses 40a, 40b and 40c and the plural image forming apparatuses 40. When a certain one of the plural image forming apparatuses 40a, 40b and 40c receives a print job from one of the client terminals 20a, 20b, 20c and 20d, or receives a copy job, the certain image forming apparatus sends a request to the load balancing apparatus 30 to execute the load control. Hereinafter, a description is given of the load balancing apparatus 30 and image forming apparatuses 40.

Load Balancing Apparatus:

Load balancing apparatus 30 includes, as illustrated in FIG. 2A, controller 31 and optionally includes display unit 37 and operation unit 38.

Controller 31 includes CPU (Central Processing Unit) 32, memories, such as ROM (Read Only Memory) 33 and RAM (Random Access Memory) 34, storage unit 35 and network interface (I/F) unit 36, where examples of the storage unit 35 include a HDD (Hard Disk Drive) and a SSD (Solid State Drive), and examples of the network interface unit 36 include a NIC (Network Interface Card) and a modem. CPU 32 reads out control programs from the ROM 33, loads the control programs onto RAM 34, and executes the control programs, thereby controlling the overall operations of the load balancing apparatus 30.

Display unit 37 includes a display like a LCD (Liquid Crystal Display) or an OEL (organic electroluminescence) display, and displays a screen relating to the load control. Operation unit 38 includes hardware devices, such as a mouse, a keyboard and hardware switches, thorough which a user can instruct various operations relating to the load control.

The controller 31 works as server-connection-number management section 31a and server-connection control section 31b, as illustrated in FIG. 2B.

Server-connection-number management section 31a obtains the number of allowable server connections defined by each of the image forming apparatuses 40. The number of allowable server connections indicates the degree of server access or the number of server connections from one or more of the client terminals 20 to one of the image forming apparatuses 40, which can be processed together with a job to be executed in parallel. Server-connection-number management section 31a associates identification information of each of the image forming apparatuses 40 and the corresponding number of allowable server connections obtained with each other to write the information and the number of allowable server connections into a load balancing table. Server-connection-number management section 31*a* then stores the load balancing table into storage unit 35.

Server-connection control section 31*b*, in response to receiving instructions to perform the load control from one of image forming apparatuses 40, refers the number of allowable server connections written in the load balancing table, and controls server access from client terminals 20 to the one of image forming apparatuses 40. In concrete terms, the server-connection control section 31*b* controls the server access from client terminals 20 to each of image forming apparatuses 40 so that the number of server connections to each of image forming apparatuses 40 does not exceed the corresponding number of allowable server connections which can be processed together with a job in execution in parallel in the each of image forming apparatuses 40.

Image Forming Apparatus:

Image forming apparatus 40 includes, as illustrated in FIG. 3A, controller 41, image reading unit 47, image processing unit 48, image forming unit 49, operation and control unit 50, storage 51 and other devices.

Controller 41 includes CPU 42, memories, such as ROM 43, RAM 44 and flash memory 45, and network interface (I/F) unit 46, where examples of the network interface unit 46 include a NIC and a modem. ROM 43 stores control programs eluding a load. control program which will be described later) and other data. Flash memory 45 stores information to be used for defining the number of allowable servers including a table in which job types and respective processing loads are associated with each other, another table in which the number of server connections and respective processing load are associated with each other, and a threshold value of the processing load, all of which will be described later and other data. CPU 42 reads out control programs from the ROM 43, loads the control programs onto RAM 44, and executes the control programs, thereby controlling the overall operations of the image forming apparatus 40. In the present example, controller 41 provides a job execution function and a server function which share a hardware resource in the image forming apparatus (for example, CPU 42 or other device) on their processing.

Controller 41 provides the job execution function by controlling image reading unit 47, image processing unit 48, image forming unit 49, and network interface unit 46. Examples of the job execution function include a copy function, a scan function, a print function and a fax function. The copy function obtains image data read by image reading unit 47, causes image processing unit 48 to perform image processing on the image data and causes image forming unit 49 to perform image forming processing on the processed image data. The scan function obtains image data read by image reading unit 47 and causes image processing unit 48 to perform image processing by using the image data. The print function causes image processing unit 48 to perform raster image processing or RIP and image processing by using a print job and then causes image forming unit 49 to perform image forming processing by using the resulting data. The fax function obtains image data read by image reading unit 47 and sends the image data to an external facsimile device through the network interface unit 46. Alternatively, the fax function receives image data from an external facsimile device through the network interface unit 46, causes image processing unit 48 to perform image processing on the image data and causes image forming unit 49 to perform image forming processing by using the processed image data.

Controller 41 provides the server function by controlling network interface unit 46 and storage 51. The server function is a function to perform a specific processing in response to a request sent from an external device, and provide a result of the processing as a service to the external device (a function to receive data from a network or output data to a network through network interface unit 46). Example of the server function include a file server function, a mail server function, a print server function and a Web server function. The file server function controls access to storage 51 from devices on a network, to allow the devices to input data to or output data from the storage 51. The mail server function transfers outgoing electronic mail messages and incoming electronic mail messages to the respective destinations or addresses. Examples of the mail server function include functions of a POP (Post Office Protocol) server and a SMTP (Simple Mail Transfer Protocol) server. The print server function receives print jobs from client terminals 20, stores and manages the print jobs in the storage 51, and distributes the print jobs to the respective image forming apparatuses 40. The Web server function causes one of client terminals 20 as a Web client to display pages on a Web browser so as to allow a user to control the image forming apparatus 40 through the displayed page.

Image reading unit (scanner) 47 is a component capable of reading an original loaded on a platen to optically obtain image data of the original. The image reading unit 47 includes a light source that scans an original, an image sensor like a CCD (Charge Coupled Device), that converts a beam of light reflected on the original into electric signal, and an A/D converter that performs analog-to-digital conversion on the electric signal.

Image processing unit 48 obtains image data by analyzing a print job and rasterizing images of pages contained in the print job to generate image data of the pages. Alternatively, image processing unit 48 obtains scan data from image reading section 47, optionally performs image processing (including color adjustment, density adjustment and size adjustment) and/or screening on the image data, and then converts the resulting data into image data which can be printed by the image forming unit 49.

Image forming unit (print engine) 49 includes hardware components for use in image forming processing like an electro-photographic or electrostatic recording image-forming process. Image forming unit 49 obtains image data, for example, image data generated from a print job or scan data read through image reading unit 47, and prints images based on the image data onto designated sheets. In concrete terms, image forming unit 49 performs following processes. That is, an exposure unit performs exposure processing by irradiating a photoreceptor drum, which is charged by a charging unit, with a laser beam in accordance with an image, to form latent images on the photoreceptor drum. A developing unit develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit.

Operation and display unit (operation panel) 50 includes a device, such as a touch panel which includes a display unit like a liquid crystal display and a pressure-sensitive operation unit in which transparent electrodes arranged on the display unit in a lattice shape. The operation and display unit 50 displays a screen for operating the image forming apparatus 40 and a screen for setting print conditions so as to allow a user to set various settings and give various instructions through the screens.

Storage 51 includes a memory, such as a HDD, a SSD or the like, which stores data to be used by client terminals 20, scan data read by image reading unit 47 and other data.

Controller 41 sets or defines a condition for restricting server access (server connections) to use the server function from client terminals 20, in accordance with a status of job execution, and instructs load balancing apparatus 30 to perform load control which restricts the server access (server connections) on the basis of the defined condition. In concrete terms, as illustrated in FIG. 3B, the controller 41 works as load determining section 41a, server-connection-number defining section 41b, instruction section 41c and operation control section 41d.

The image forming apparatus 40 includes a table (called as a first table) stored in flash memory 45 or another memory. In the first table, job types and respective processing loads (the amounts of resource consumption, for example, CPU loads) on a common hardware resource (for example, CPU 42), where the common hardware resource is a hardware resource to be used to provide the job execution function and the server function. Load determining section 41a determines, by referring to the first table, a processing load (CPU load) of a job in execution on the common hardware resource, in other words, a load needed for executing a job on the common hardware resource.

The image forming apparatus 40 includes another table (called as a second table) stored in flash memory 45 or another memory. In the second table, the amounts of server access (the numbers of server connections) to use the server function and respective processing loads (the amounts of resource consumption, for example, CPU loads) on the common hardware resource (for example, CPU 42). Server-connection-number defining section 41b refers to the second table, finds, among the processing loads in the second table, a processing load the sum of which and the processing load determined by the load determining section 41a becomes equal to or more than a predetermined threshold value of the processing load, and then defines the number of server connections corresponding to the processing load found (the number of server connections which can be processed together with the job in parallel, referred to as the number of allowable server connections). In other words, the server-connection-number defining section 41b subtracts the processing load determined by the load determining section 41a from the predetermined threshold value of the processing load and defines the number of server connections corresponding to the resulting processing load by using the second table.

Instruction section 41c sends, to the load balancing apparatus 30, the number of allowable server connections which can be processed together with the job in parallel, defined by the server-connection-number defining section 41b, and gives the load balancing apparatus 30 instructions to perform the load control based on the number of allowable server connections.

Operation control section 41d compares the number of current server connections and the number of allowable server connections which can be processed together with the job in parallel. When the number of current server connections is less than the number of allowable server connections, operation control section 41d executes the job in a normal mode. On the other hand, when the number of current server connections is not less than the number of allowable server connections, such the server connections can degrade the performance and reliability of the job execution and therefore operation control section 41d executes the job in a low-speed mode in which a processing load of a job on the common hardware resource is smaller than a processing load of the job on the common hardware resource in the normal mode.

The load determining section 41a, server-connection-number defining section 41b, instruction section 41c and operation control section 41d may be constituted as hardware devices. Alternatively, the load determining section 41a, server-connection-number defining section 41b, instruction section 41c and operation control section 41d may be provided by a load control program which causes the controller 41 to function as these sections (which causes the image forming apparatus 40 to perform processing to determine load, processing to define the number of server connections, instruction processing and operation control processing) when being executed by CPU 42, That is, the controller 41 may be configured to serve as the load determining section 41a, server-connection-number defining section 41b, instruction section 41c and operation control section 41d, when CPU 42 executes the load control program.

It should be noted that FIGS. 1 to 3B show network system 10, load balancing apparatus 30 and image forming apparatus 40 of the present example for illustrative purpose only, and their structure can be modified appropriately. For example, image forming apparatus 40 of the present example in FIGS. 2A and 2B includes image reading unit 47 and image forming unit 49, but alternatively can be a single-function printer which does not include image reading unit 47 or a facsimile having communication function using a telephone line.

A description is given of the communication among client terminals 20, load balancing apparatus 30 and image forming apparatuses 40 in network system 10 having the above-described structure, with reference to FIG. 4. As one example of the plural client terminals 20 and image forming apparatuses 40, FIG. 4 illustrates client terminals 20a, 20b, 20c and 20d and image forming apparatuses 40a, 40b and 40c. In FIG. 4, a dotted arrow represents a destination of a job (a print job or a copy job) given by one of client terminals 20a, 20b, 20c and 20d or a user, and a solid arrow represents a destination of a request to a server (a server request). In general, load balancing apparatus 30 receives all of requests from plural client terminals 20a, 20b, 20c and 20d to servers, and distributes the received requests across plural servers so as not to overload one of the servers. In the present example, the network system 10 handles server requests and job as illustrated in FIG. 4. As for requests sent from client terminals 20a to 20d to server functions of plural image forming apparatuses 40a to 40c, the network system 10 employs such a general load balancing apparatus 30, and the load balancing apparatus 30 receives all the requests from client terminals 20a to 20d and then distributes the requests across the plural image forming apparatuses 40a to 40c. As for a request to execute a print job, it is preferable that each of client terminals 20a to 20d sends such a job to physically closest one of image forming apparatuses 40a to 40c. Therefore, each of client terminals 20a to 20d is configured to send a print job directly to a specific image forming apparatus chosen according to user's wishes among image forming apparatuses 40a to 40c. As for a request to execute a copy job, since execution of such a job is instructed by user's operations on an operation panel of one of image forming apparatuses 40a to 40c, a copy job is also executed on a specific image forming apparatus chosen according to user's wishes among image forming apparatuses 40a to 40c.

Next, a description is given of control of server load to be performed when one of the image forming apparatuses 40a to 40c receives a job (a print job or a copy job). In response to receiving a job (a print job) from one of client terminals 20a to 20d or receiving a job (a copy job) due to user's operations on an operation panel of one of the image forming apparatuses 40a to 40c, the one of the image forming apparatuses 40a to 40c executes the received job according to, for example, the processes illustrated in FIG. 5. Such processes can control the processing load of the server function in execution of a job to be a predetermined threshold value or less and can secure the performance and reliability of execution of the job.

Processes of Job Execution:

(1) Receiving a Print Job (or a Copy Job)

In response that one of client terminals 20a to 20n sends through a network a print job to a specific image forming apparatus 40 which was chosen according to user's wishes, the specific image forming apparatus 40 receives the print job. As for a copy job, in response that a user gives instructions to execute a copy job by operating an operation panel of a specific image forming apparatus 40 chosen according to user's wishes, the specific image forming apparatus 40 receives the copy job.

(2) Instructing to Perform Load Control

The specific image forming apparatus 40, on the basis of the type of the job received, determines a processing load (a CPU load) needed for execution of the job. On the basis of the processing load determined, the specific image forming apparatus 40 defines the number of allowable server connections that can be processed together with the job in parallel on the common hardware resource. Then, the specific image forming apparatus 40 instructs load balancing apparatus 30 to perform load control to restrict the number of server connections(which correspond to server requests from client terminals 20b to 20n in FIG. 5) so as not to exceed the number of allowable server connections during the execution of the job.

A description is given of one of examples of a way to define the number allowable server connections that can be processed together with the job in parallel. First, the image forming apparatus 40 refers to the first table illustrated in FIG. 7 and determines a CPU load needed for execution of the job received, where in the first table, various types of job are associated with respective processing loads on the common hardware resource for example, information pieces about JOB TYPE, COLOR TYPE, IMAGE SIZE and AVERAGE CPU LOAD in FIG. 7 are associated with each other). Next, the image forming apparatus 40 refers to the second table illustrated in FIG. 8 and defines the number of server connections which makes the sum of the CPU load needed for execution of the job and a CPU load corresponding to the number of server connections, become a predetermined threshold value or smaller, where in the second table, the numbers of server connections are associated with respective average CPU loads on the common hardware resource (for example, information pieces about NUMBER OF SERVER CONNECTIONS and AVERAGE CPU LOAD in FIG. 8 are associated with each other). The number of server connections defined is used in the following processes as the number of allowable server connections which can be processed together with the job in parallel on the common hardware resource.

(3) Judging Whether to Start a Job

After instructing the load balancing apparatus 30 to perform the load control, the image forming apparatus 40 judges whether to start execution of the job. In these processes, the image forming apparatus 40 judges, before executing the job, whether the number of current server connections is not less than the number of allowable server connections which can be processed together with the job in parallel.

(4) Executing a Job

If the number of current server connections is less than the number of allowable server connections, the image forming apparatus 40 executes the job in the normal mode. If the number of current server connections is not less than the number of allowable server connections, the image forming apparatus 40 executes the job in the low-speed mode in which a CPU load of a job on the common hardware resource is smaller than a CPU load of the job on the common hardware resource in the normal mode.

(5) Instructing to Cancel the Load Control

After completion of the execution of the job, the image forming apparatus 40 instructs the load balancing apparatus 30 to cancel the load control which was instructed in the second process.

A description is given hereinafter of operation of the image forming apparatus 40 in details. CPU 42 reads out a load control programs stored in ROM 43, loads the program onto RAM 44, and executes the program, thereby causing controller 41 to perform the processes of the steps of the flowchart illustrated in FIG. 6.

First, controller 41 receives a job (S101). Next, controller 41 (load determining section 41a) analyzes the job, and obtains a processing load of the job in execution on the common hardware resource, on the basis of the type of the analyzed job, by referring to the first table which has been prepared and recorded (S102). In the first table, job types and respective processing loads on the common hardware resource are associated with each other. Next, controller 41 (server-connection-number defining section 41b) defines the number of allowable server connections which can be processed together with the received job in parallel on the common hardware resource, by using the above-described way and referring to the second table which has been prepared and recorded (S103). In the second table, the numbers of server connections and respective processing loads on the common hardware resource are associated with each other. Then, controller 41 (instruction section 41c) sends the defined number of allowable server connections to load balancing apparatus 30, and instructs the load balancing apparatus 30 to perform the load control to restrict the number of server connections from client terminals 20 so that the number of server connections does not exceed the number of allowable server connections which can be processed together with the job in parallel on the common hardware resource (S104).

If the image forming apparatus 40 starts execution of the job in the condition that one or more of client terminals 20 are already accessing to the server function of the image forming apparatus 40 concerned, the server connection can degrade the performance and reliability of the execution of the job. In view of that, controller 41 (operation control section 41d) judges whether the number of current server connections is less than the number of allowable server connections that can be processed together with the job in parallel on the common hardware resource (S105). On judging that the number of current server connections is less than the number allowable server connections, controller 41 (operation control section 41d) executes the job in the normal mode (S106). On judging that the number current server connections is not less than the number of allowable server connections, controller 41 (operation control section 41d) executes the job in the low-speed mode (S107). Successively, controller 41 (instruction section 41c) instructs load balancing apparatus 30 to cancel the load control to restrict the number of server connections, after completion of the job (S108).

As described above, on executing a job, image forming apparatus 40 defines the number of allowable server connections, which indicates the number of server connections that can be processed together with the job in parallel on the common hardware resource, and instructs the load balancing apparatus 30 to perform the load control to restrict the server connections on the basis of the defined number of allowable server connections. Such control can secure the performance and reliability of job execution in the image forming apparatus 40.

Example 2

Figure 9:
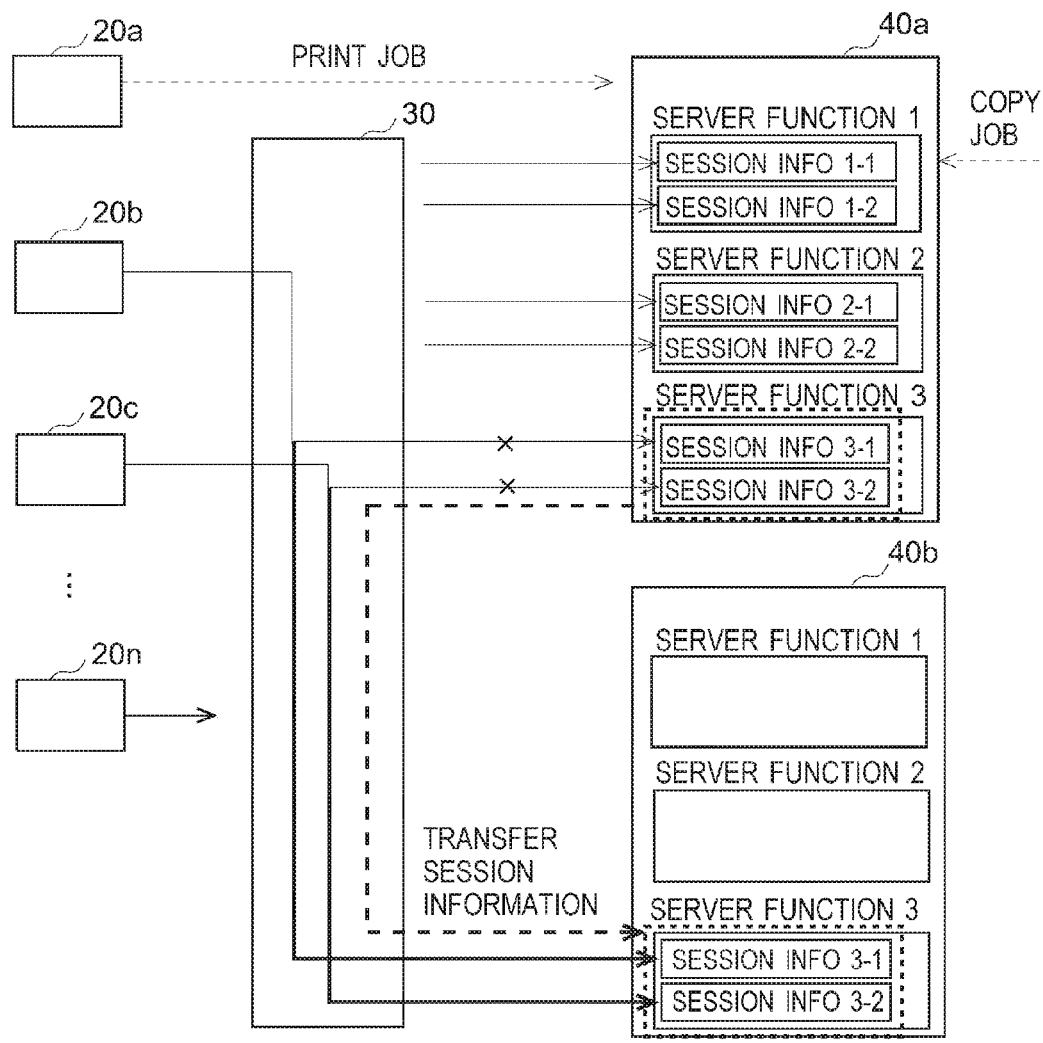
FIG. 9 is a schematic diagram of an example of processing to be executed in a network system including image forming apparatuses according to Example 2.
Figure 10:
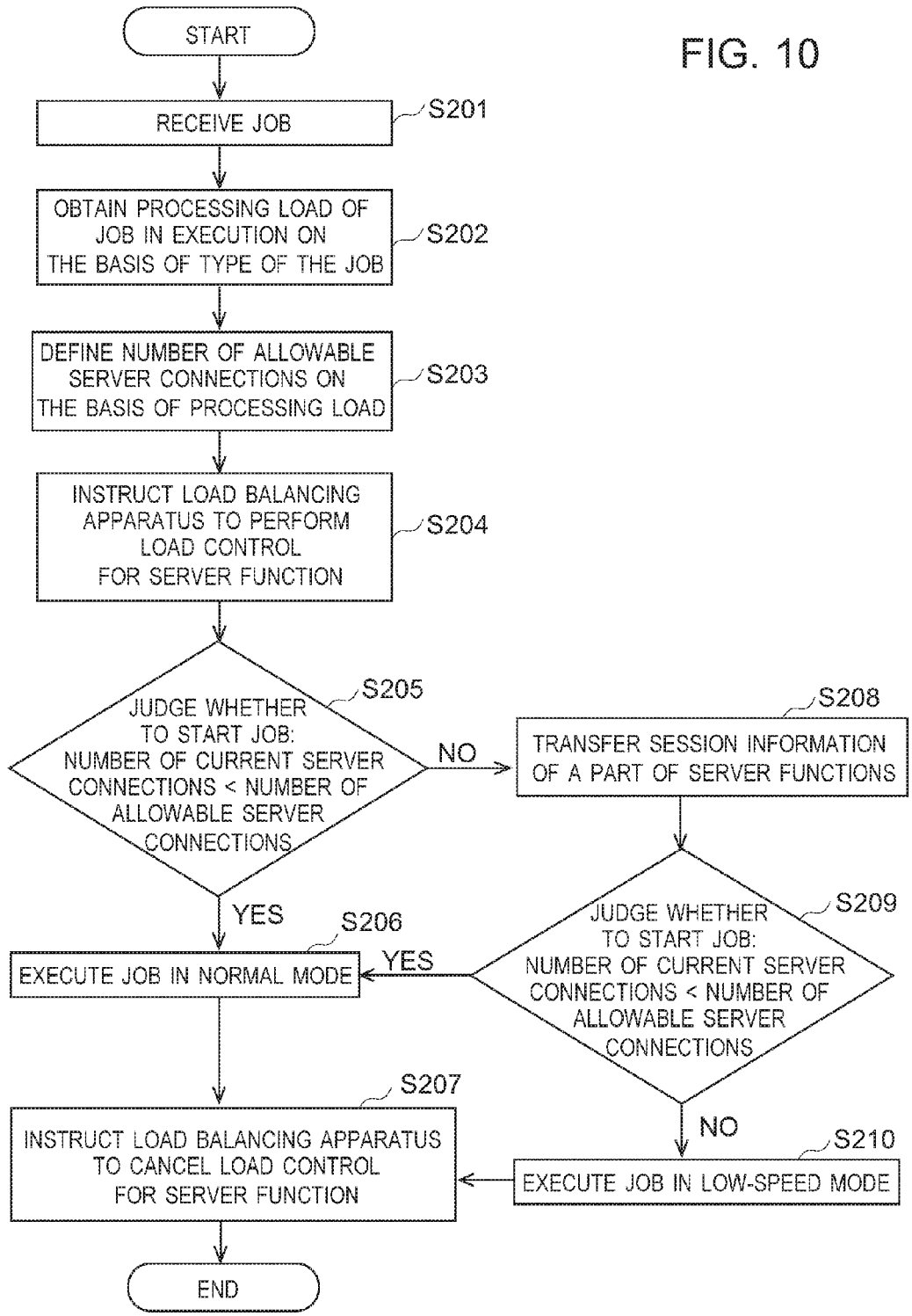
FIG. 10 is a flowchart of an example of operations of the image forming apparatus according to Example 2.

A description will be given of an example of a network system, a non-transitory computer-readable storage medium storing a load control program and a load control method of Example 2, with reference to FIG. 9 and FIG. 10. FIG. 9 is a schematic diagram of an example of a network system including image forming apparatuses according to Example 2. FIG. 10 is a flowchart illustrating an example of operations of the image forming apparatus according to Example 2.

In the above-described Example 1, in the condition that the number current server connections is not less than the number of allowable server connections which can be processed together with a job on a common hardware resource, the controller of the image forming apparatus executes the job in a low-speed mode. On the other hand, Example 2 employs processing to, in the above condition, take over a service (for example, a Web service offered by a Web server function) provided by a specific image forming apparatus 40a to execute the job, to another image forming apparatus 40b among plural image forming apparatuses 40. It reduces the processing load on the specific image forming apparatus 40a so as to allow the specific image forming apparatus 40a to execute the job in the normal mode. In FIG. 9, a dotted arrow represents a destination of a job (a print job or a copy job) given by one of client terminals 20 or a user, a solid arrow represents a destination of a request to a server request, a thick solid arrow represents control to transfer session information, and a thick solid arrow represents a destination of a server request after the control to transfer the session information. As an example of a plural client terminals 20, FIG. 9 illustrates client terminals 20a, 20b, 20c . . . to 20n.

To perform this processing, load balancing apparatus 30 and image forming apparatus 40a have the basic structures similarly to those illustrated in FIGS. 2A and 2B and FIGS. 3A and 3B, but controller 41 of image forming apparatus 40a and controller 31 of load balancing apparatus 30 perform the following processing. When judging that the number of current server connections is not less than (equal to or greater than) the number of allowable server connections that can be processed together with the job in parallel, the controller 41 (instruction section 41c) of image forming apparatuses 40a instructs load balancing apparatus 30 to perform control to transfer session information of a server function which is currently offered to one of client terminals 20b to 20n (information representing communications between the one of client terminals 20b to 20n and the server function of the image forming apparatus 40a) to another image forming apparatuses 40b having the same type of server function. The controller 41 (instruction section 41c) of the image forming apparatuses 40a further instructs the load balancing apparatus 30 to perform control to change the destination of one or more requests to the server function of the image forming apparatuses 40a from at least one of client terminals 20b to 20n, to the another image forming apparatuses 40b. According to the above-described instructions, the controller 31 (server-connection control section 31b) of the load balancing apparatus 30 performs the control to transfer the session information to another image forming apparatuses 40b and change the destination of server access to another image forming apparatuses 40b.

In concrete terms, image forming apparatuses 40a performs the following processing to judge whether to start a job in the process (3) in the processes of job execution according to Example 1 illustrated in FIG. 5.

First, controller 41 of image forming apparatuses 40a, before executing a job, determines whether the number of current server connections is not less than the number of allowable server connections that can be processed together with the job in parallel on the common hardware resource. On determining that the number of current server connections is less than the number of allowable server connections, the controller 41 executes the job in the normal mode, similarly to Example 1. On the other hand, on determining that the number of current server connections is not less than the number of allowable server connections, the controller 41 sends instructions to load balancing apparatus 30 as follows, as illustrated in FIG. 9. That is, the controller 41 transfers session information kept by a part of the server functions of the image forming, apparatus 40a (server function 3 of the image forming apparatus 40a in this example of FIG. 9) to a corresponding server function of another image forming apparatus 40b (server function 3 of the image forming apparatus 40b in this example of FIG. 9) through load balancing apparatus 30 (please see the thick dotted arrow in FIG. 9). The controller 41 further instructs load balancing apparatus 30 so that, after the transfer of the session information, one or more requests from client terminals 20b and 20c which accessed to the part of the server functions of the image forming apparatus 40a are sent to the another image forming apparatus 40b (please see the thick solid arrows in FIG. 9).

When the control to transfer the session information results in that the number current server connections becomes less than the number of allowable server connections that can be processed together with the job in parallel on the common hardware resource, the image forming apparatus 40a is allowed to executes the job in the normal mode. It secures the performance and reliability of the job execution in the image forming apparatus 40a. The above-described example illustrated the control under the condition that a server function of each of the image forming apparatuses 40a and 40b holds session information. In another condition that each of client terminals 20a to 20n holds their session information, there is no need to transfer the session information as described-above and image forming apparatuses 40a may just instruct load balancing apparatus 30 to send one or more requests from at least one of client terminals 20b to 20n, to another image forming apparatuses 40b.

A description is given he of operation of image forming apparatus 40a in details. CPU 42 reads out a load control programs stored in ROM 43, loads the program onto RAM 44, and executes the program, thereby causing controller 41 to perform the processes of the steps of the flowchart illustrated in FIG. 10.

Similarly to Example 1, controller 41 receives a job (S201). Next, controller 41 (load determining section 41a) obtains the processing load of the job in execution on the common hardware resource, by referring to the first table which has been prepared and recorded (S202). In the first table, job types and respective processing loads of the common hardware resource are associated with each other. Next, controller 41 (server-connection-number defining section 41b) defines the number of allowable server connections which can be processed together with the received job in parallel on the common hardware resource, by referring to the second table which has been prepared and recorded (S203). In the second table, the numbers of server connections and respective processing loads on the common hardware resource are associated with each other. Then, controller 41 (instruction section 41c) sends the defined number of allowable server connections to load balancing apparatus 30, and instructs the load balancing apparatus 30 to perform the load control to restrict the number of server connections from client terminals 20 on the basis of the number of allowable server connections (S204).

Next, controller 41 (operation control section 41d) judges whether the number of current server connections is less than the number of allowable server connections that can be processed together with the job in parallel on the common hardware resource (S205). On judging that the number of current server connections is less than the number of allowable server connections, controller 41 (operation control section 41d) executes the job in the normal mode (S206). On judging that the number of current server connections is not less than the number of allowable server connections, controller 41 in Example 2 performs the following processing, rather than executing the job in the low-speed mode as in Example 1. That is, controller 41 (instruction section 41c) transfers session information of a part of server functions of image forming apparatuses 40a currently used by one or more of client terminals 20b to 20n, to another of image forming apparatuses 40b through load balancing apparatus 30, and instructs the load balancing apparatus 30 to send one or more requests given by the one or more client terminals 20b to 20n which are using the part of server functions, to another image forming apparatus 40b to which the session information was transferred (S208).

After that, the controller 41 (operation control section 41d) judges whether number of current server connections is less than the number of allowable server connections that can be processed together with the job in parallel on the common hardware resource (S209). On judging that the number of current server connections becomes less than the number of allowable server connections, controller 41 (operation control section 41d) executes the job in the normal mode (S206). On judging that the number of current server connections becomes not less than the number of allowable server connections, controller 41 (operation control section 41d) executes the job in the low-speed mode (S210). Successively, controller 41 (instruction section 41c) instructs load balancing apparatus 30 to cancel the load control to restrict the number of server connections, after completion of the job (S207).

As described above, under the condition that the number of current server connections in image forming apparatus 40a is not less than the number of allowable server connections that can be processed together with a job in parallel, image forming apparatuses 40a of Example 2 transfers session information of its server function which is currently used by the server connections from at least one of client terminals 20a to 20n, to another image forming apparatuses 40b, and instructs load balancing apparatus 30 to send one or more requests from the at least one of the client terminals to the server function, to another of the image forming apparatuses 40b. Such control can secure the performance and reliability of job execution in the image forming apparatus 40a at a higher level in comparison with the control of Example 1.

Example 3

Figure 11:
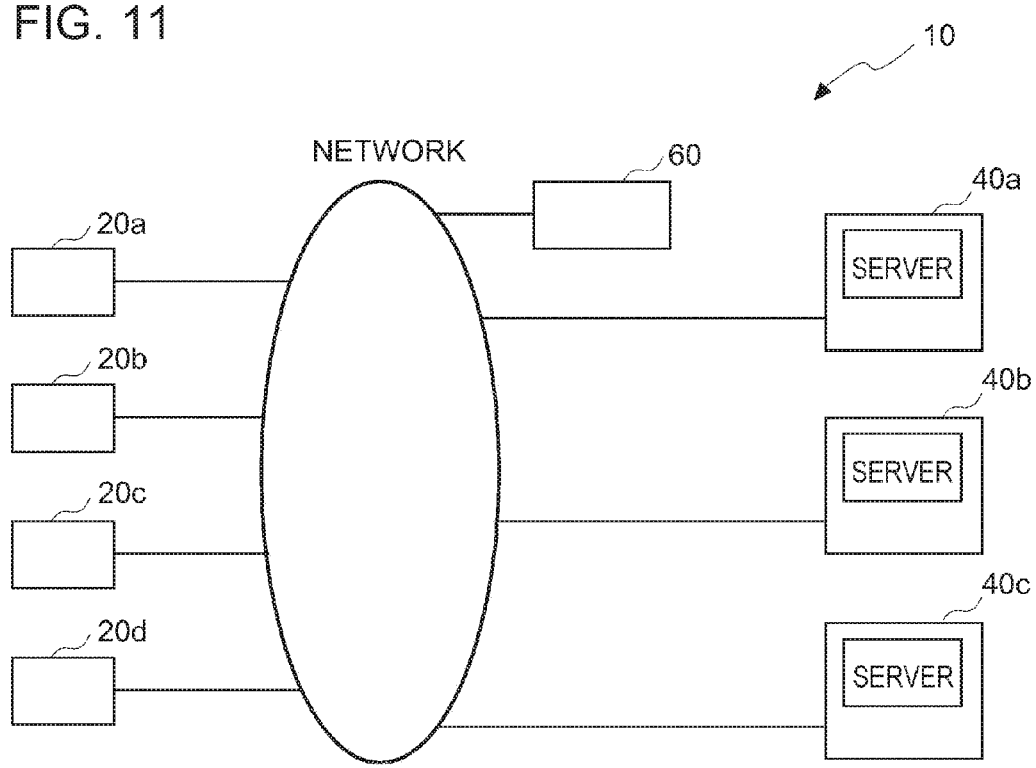
FIG. 11 is a schematic diagram of an example of a network system including image forming apparatuses according to Example 3.
Figure 12A:
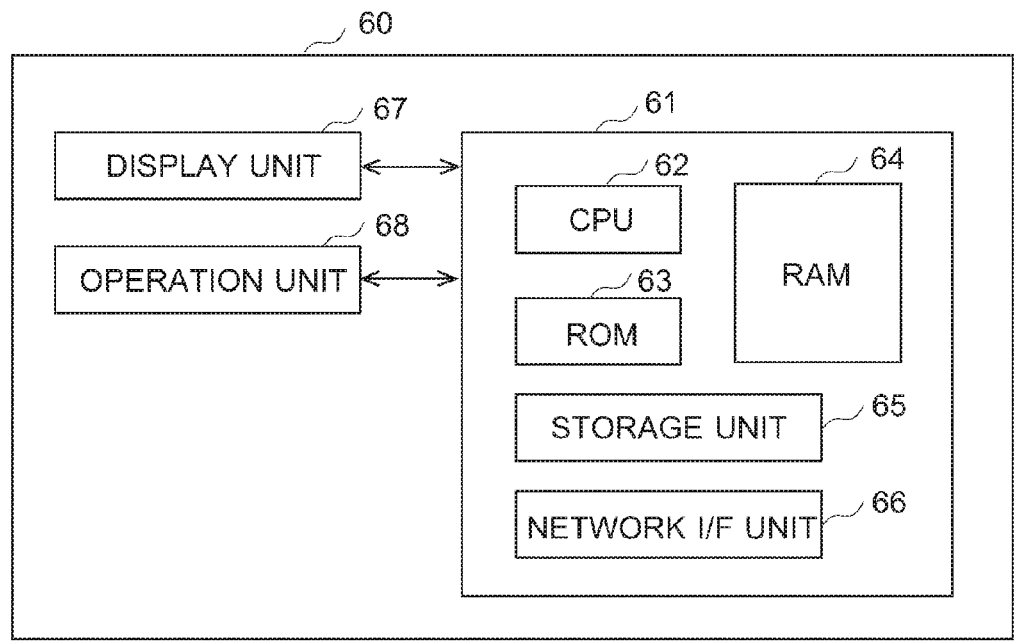
FIGS. 12A and 12B are block diagrams of an example of the structure of a management apparatus according to Example 3.
Figure 12B:
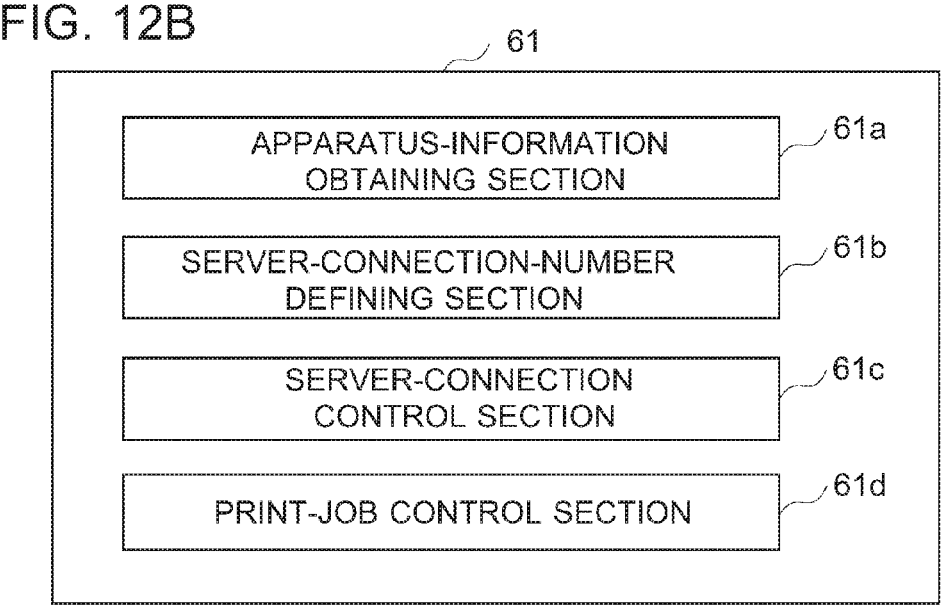
Figure 13:
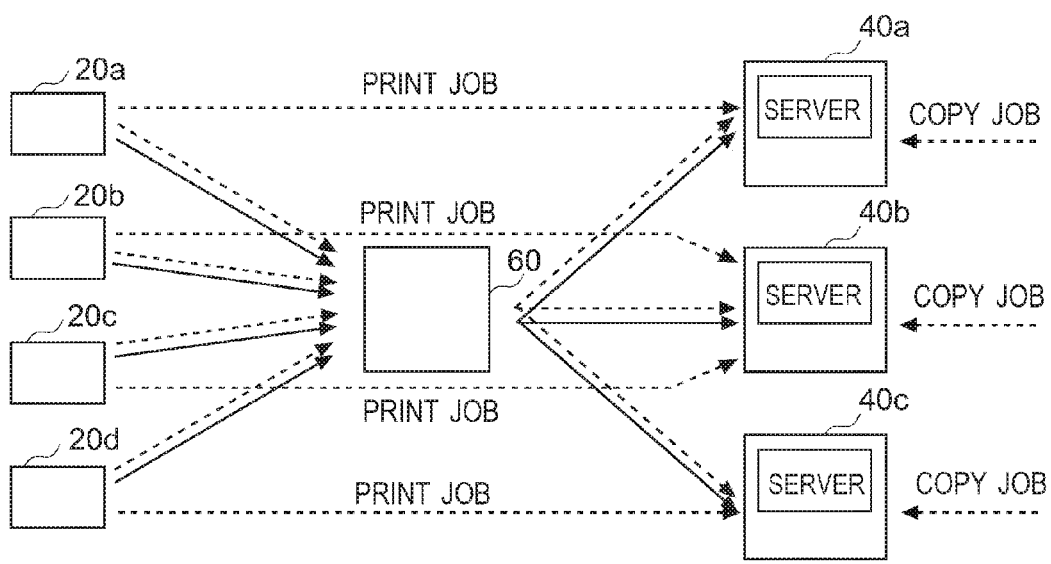
FIG. 13 is a schematic diagram of an example of processing to be executed in a network system including image forming apparatuses according to Example 3.

A description will be given of an example of a network system, a non-transitory computer-readable storage medium storing a load control program and a load control method of Example 3, with reference to FIGS. 11 to 21. FIG. 11 is a schematic diagram of an example of a network system according to Example 3. FIGS. 12A and 12B are block diagrams of an example of the structure of a management apparatus according to Example 3. FIG. 13 is a schematic diagram of an example of processing to be executed in a network system according to Example 3. FIGS. 14 to 17 are sequence diagrams illustrating an example of processing in the network system. FIGS. 18 to 21 are flowcharts illustrating an example of operations of the image forming apparatus according to Example 3.

The above-described Example 1 and Example 2 employ network system 10 in which general load balancing apparatus 30 is located on a network and one of image forming apparatuses 40 instructs the load balancing apparatus 30 to perform the load control. On the other hand, Example 3 employs network system 10, in which management apparatus 60 is arranged in place of the load balancing apparatus 30, as illustrated in FIG. 11. The management apparatus 60 is configured to manage plural image forming apparatuses 40 to distribute a processing load of a server function across the plural image forming apparatuses 40. As one example of network system 10 including plural client terminals 20 and plural image forming apparatuses 40, FIG. 11 illustrates network system 10 including client terminals 20a, 20b, 20c and 20d and image forming apparatuses 40a, 40b and 40c. In the present example, plural image forming apparatuses 40 contained in the network system 10 can be managed as one or more groups, and the management apparatus 60 may manage image forming apparatuses 40 belonging to one group to be a target of load control of the present example.

The management apparatus 60 includes, as illustrated in FIG. 12A, controller 61 and optionally includes display unit 67 and operation unit 68.

Controller 61 includes CPU 62, memories, such as ROM 63 and RAM 64, storage unit 65, and network interface (I/F) unit 66, where examples of the storage unit 65 include a HDD and a SSD and examples of the network interface unit 66 include a NIC and a modem. CPU 62 reads out control programs from the ROM 63, loads the control programs onto RAM 64, and executes the control programs, thereby controlling the overall operations of the management apparatus 60.

Display unit 67 includes a display like a LCD or an OEL display, and displays screens relating to management of the image forming apparatuses 40. Operation unit 68 includes hardware devices, such as a mouse, a keyboard and hardware switches, thorough which a user can instruct various operations relating to management of the image forming apparatuses 40.

Controller 61 is configured to receive a request sent from one of client terminals 20 to the server function of one of image forming apparatuses 40 and send the request to one of image forming apparatuses 40 through network interface unit 66. Controller 61 obtains, from each of the image forming apparatuses 40, information relating to a status of job execution in the each of the image forming apparatuses 40, and then performs load control to restrict server access (server connections) from one or more of client terminals 20 to each of the image forming apparatuses 40 in accordance with the status of job execution. In concrete terms, controller 61 works as apparatus-information obtaining section 61a, server-connection-number defining section 61b, server-connection control section 61d and print-job control section 61d, as illustrated in FIG. 12B.

Apparatus-information obtaining section 61a obtains apparatus information from each of plural image forming apparatuses 40 connected with the management apparatus 60 through a network (preferably, plural image forming apparatuses 40 which were registered in advance as a management target in a table in the management apparatus 60), and stores the apparatus information of each of image forming apparatuses 40 into storage unit 65 or the like. Examples of the apparatus information include a first table in which job types and respective processing loads are associated with each other, a second table in which the numbers of server connections and the respective processing loads are associated with each other, and a threshold value of the processing load. Alternatively, the apparatus-information obtaining section 61a may obtain the apparatus information from, for example, MIB (Management Information Base) which is managed according to SNMP (Simple Network Management Protocol), or each of the image forming apparatuses 40 may send the apparatus information to the management apparatus 60 to be obtained by the apparatus-information obtaining section 61a.

Server-connection-number defining section 61b refers to the first table of one of image forming apparatuses 40, and determines a CPU load needed for executing a job by the one of image forming apparatuses 40, where examples of the job includes a print job sent from one of client terminals 20 and a copy job instructed by user's operations on an operation panel of the one of image forming apparatuses 40. In the first table, job types and respective processing loads (CPU loads) on the common hardware resource are associated with each other. Server-connection-number defining section 41b further refers to the second table of the one of image forming apparatuses 40, in which the server access numbers (the server connection numbers) are associated with respective processing loads (CPU loads) on a common hardware resource, and defines the number of allowable server connections as follows. That is, the server-connection-number defining section 41b finds, among the processing loads in the second table, a processing load the sum of which and the determined CPU load becomes equal to or more than a predetermined threshold value of the processing load, and then defines the number of server connections corresponding to the processing load found (the number of server connections which can be processed together with the job in parallel, referred to as the number of allowable server connections). Then, server-connection-number defining section 61b associates identification information of the one of image forming apparatuses 40 with the number of allowable server connections defined and writes them into a load balancing table to record the load balancing table into storage unit 65.

Server-connection-control section 61c receives all of requests sent from client terminals 20 to server functions provided by plural image forming apparatuses 40, and distributes the received requests across the plural image forming apparatuses 40 so as to balance the processing load of the server functions, on the basis of the number of allowable server connections that can be processed together with the job in parallel in each of the plural image forming apparatuses 40. In this process, server-connection control section 61c may define the destination of the requests from among image forming apparatuses 40 which was registered in advance as a management target in a table.

Print-job control section 61d receives all of print jobs sent from client terminals 20, and sends each of the print jobs to a specific image forming apparatus designated by one of client terminals 20 from among the image forming apparatuses 40.

Apparatus-information obtaining section 61a, server-connection-number defining section 61b, server-connection control section 61c and print-job control section 61d may be constituted as hardware devices. Alternatively, the apparatus information obtaining section 61a, server-connection-number defining section 61b, server-connection control section 61c and print-job control section 61d (particularly, apparatus-information obtaining section 61a, server-connection-number defining section 61b and server-connection control section 61c) may be provided by a load control program which causes the controller 61 to function as these sections (in the other words, causes management apparatus 60 to performs apparatus information obtaining processing, server-connection-number defining processing and server-connection control processing) when being executed by CPU 62. That is, the management apparatus 60 may be configured to serve as the apparatus-information obtaining section 61a, server-connection-number defining section 61b, server-connection control section 61c and print-job control section 61d, when CPU 62 executes the load control program.

A description is given of the communication among client terminals 20, management apparatus 60 and image forming apparatuses 40 in network system 10 having the above-described structure, with reference to FIG. 13. As one example of the plural client terminals 20 and the plural image forming apparatuses 40 of the network system 10, FIG. 13 illustrates client terminals 20a, 20b, 20c and 20d and image forming apparatuses 40a, 40b and 40c. In FIG. 13, a dotted arrow represents a destination of a job (a print job or a copy job), and a solid arrow represents a destination of a server request. As for requests from client terminals 20a to 20d to the server functions of image forming apparatuses 40a, 40b and 40c, management apparatus 60 receives all the request and distributes the received requests across plural image forming apparatuses 40a, 40b and 40c, as illustrated in FIG. 13. As for a request to execute a print job, each of client terminals 20a to 20d sends such a job to specific one of image forming apparatuses 40a to 40c directly or through management apparatus 60. As for a request to execute a copy job, since execution of such a job is instructed by user's operations on an operation panel of one of image forming apparatuses 40a to 40c, a copy job is also executed on a specific image forming apparatus chosen according to user's wishes among image forming apparatuses 40a to 40c.

Next, a description is given hereinafter of server load control when one of image forming apparatuses 40 receives a job (a print job or a copy job). In response to receiving a job (a print job) from one of client terminals 20 directly or through management apparatus 60 or receiving a job (a copy job) due to user's operations on an operation panel of one of the image forming apparatuses 40, the image forming apparatuses 40 and management apparatus 60 perform, as one example, the following processing. The processing includes periodic processing to obtain apparatus information, processing on executing a print job through management apparatus 60, processing on direct reception of a print job or reception of a copy job, and processing of server load balancing with referring to a load balancing table. A description is given hereinafter of the processing, with reference to sequence diagrams illustrated in FIGS. 14 to 17 and flowcharts illustrated in FIGS. 18 to 21.

Figure 14:
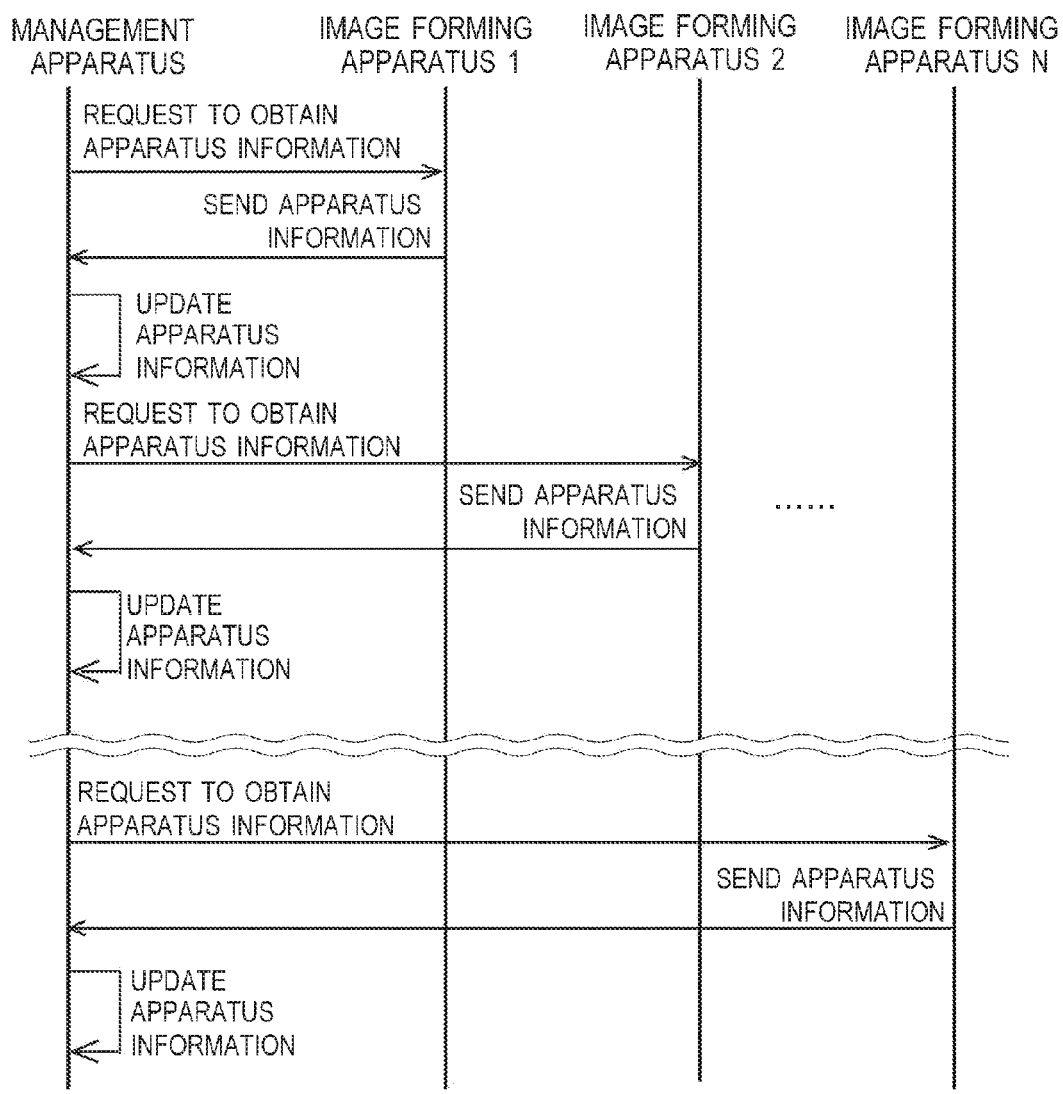
FIG. 14 is a sequence diagram of an example of processing (processing to obtain apparatus information) in the network system including image forming apparatuses according to Example 3.
Figure 18:
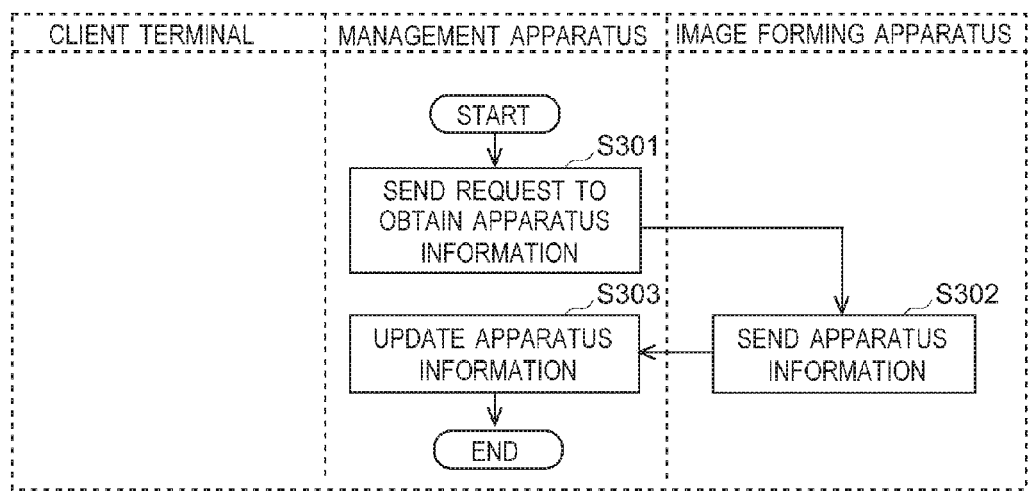
FIG. 18 is a flowchart of an example of operations (processing to obtain apparatus information) of the image forming apparatus according to Example 3.

Periodic Processing to Obtain Apparatus Information:

As illustrated in the sequence diagram illustrated in FIG. 14 and the flowchart illustrated in FIG. 18, controller 61 (apparatus-information obtaining section 61*a*) of management apparatus 60 sends requests to obtain apparatus information to plural image forming apparatuses 40 (image forming apparatus 1, image forming apparatus 2, . . . image forming apparatus N in FIG. 14) which are connected to the management apparatus 60 through a network, at regular intervals (S301). In response to the requests to obtain apparatus information, controller 41 of each of image forming apparatuses 40 sends apparatus information (including, for example, a first table in which job types and respective processing loads on the common hardware resource are associated with each other as illustrated in FIG. 7, a second table in which the numbers of server connections and the respective processing loads of the common hardware resource are associated with each other as illustrated in FIG. 8, and a threshold value of the processing load) to management apparatus 60 (S302). Successively, controller 61 (apparatus-information obtaining section 61*a*) of management apparatus 60 records the obtained apparatus information into storage unit 65 to update the apparatus information which has already been recorded (S303). This example employs network system 10 such that, in response to a request to obtain apparatus information sent by management apparatus 60, each of image forming apparatuses 40 sends the apparatus information to the management apparatus 60. Alternatively, there may be prepared MIB to which image forming apparatuses 40 registered their apparatus information in advance, and management apparatus 60 may obtain apparatus information of image forming apparatuses 40 from the MIB at a certain times.

Figure 15:
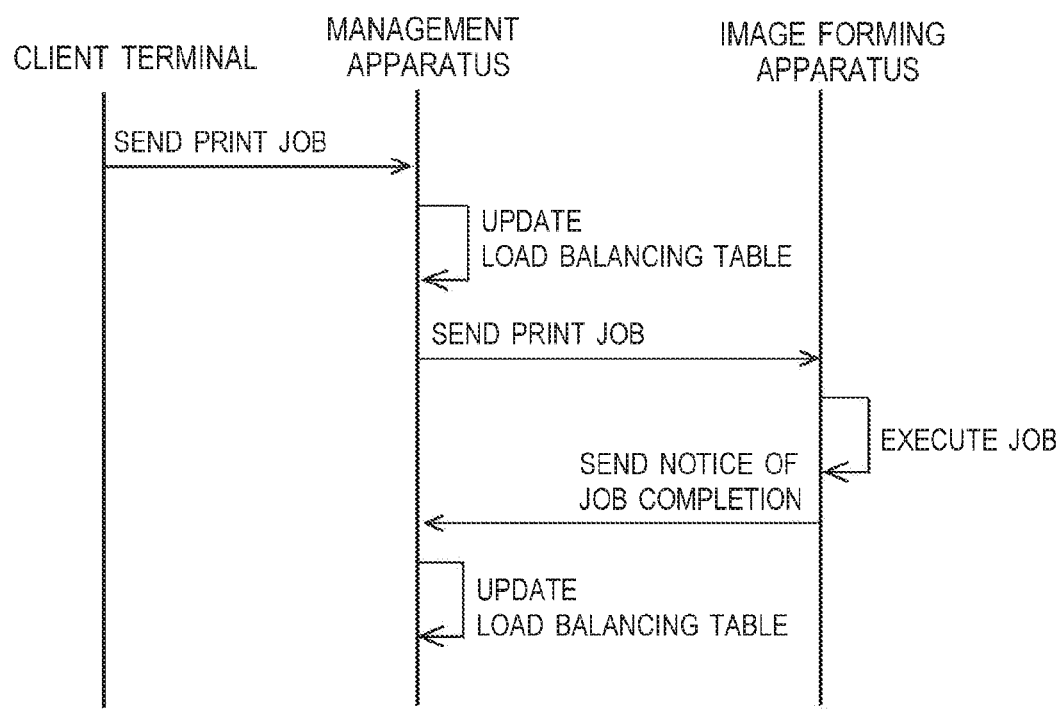
FIG. 15 is a sequence diagram of an example of processing (processing of a print job through the management apparatus) in the network system including image forming apparatuses according to Example 3.
Figure 19:
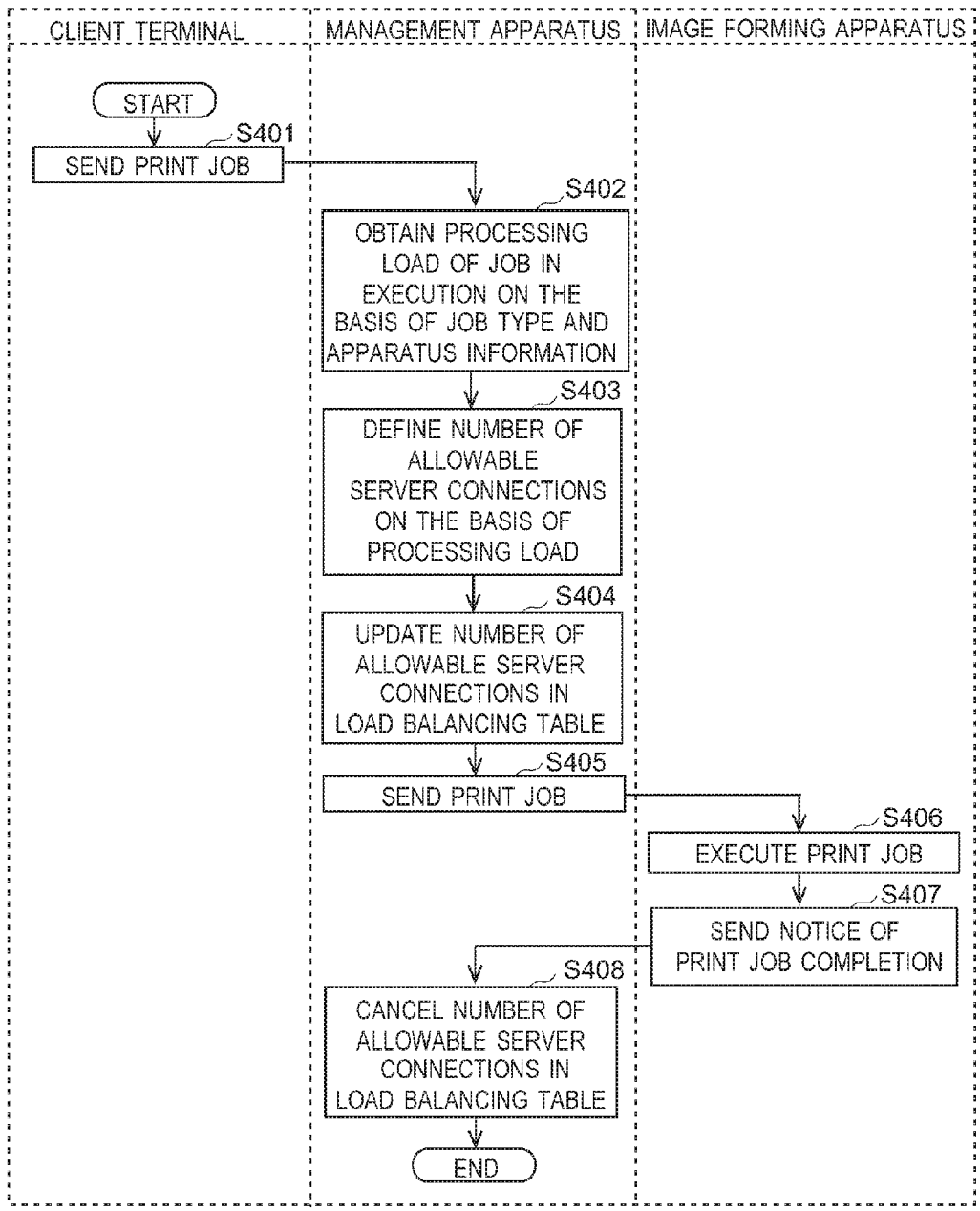
FIG. 19 is a flowchart of an example of operations (processing of a print job through the management apparatus) of the image forming apparatus according to Example 3.

Processing on Executing a Print Job through Management Apparatus:

As illustrated in the sequence diagram illustrated in FIG. 15 and the flowchart illustrated in FIG. 19, in response that management apparatus 60 receives a print job sent from one of client terminals 20 (S401), controller 61 (server-connection-number defining section 61*b*) of management apparatus 60 analyzes the print job, refers to the first table obtained from the specific image forming apparatus 40 to which the print job is to be sent, and obtains a CPU load of the print job in execution in the specific image forming apparatus 40 (S402). Next, controller 61 (server-connection-number defining section 61*b*) refers to the second table and a threshold value of the processing load obtained from the specific image forming apparatus 40, and defines the number of server connections which can be processed together with the print job in parallel (the allowable server connection number) on the common hardware resource (S403). The controller 61 (server-connection-number defining section 61*b*) updates the number of server connections to the specific image forming apparatus 40 recorded in the load balancing table by using the allowable server connection number defined (S404).

After completion of updating the load balancing table, controller 61 (print-job control section 61*d*) of management apparatus 60 sends the print job to the specific image forming apparatus 40 (S405). In response to receiving the print job, the specific image forming apparatus 40 executes the print job (S406), and sends a notice of completion of a print job to management apparatus 60 after the completion of execution of the print job (S407). In response to receiving the notice of completion of a print job, controller 61 (server-connection-number defining section 61*b*) of management apparatus 60 updates the load balancing table to cancel the number of allowable server connections set in the load balancing table (S408).

Figure 16:
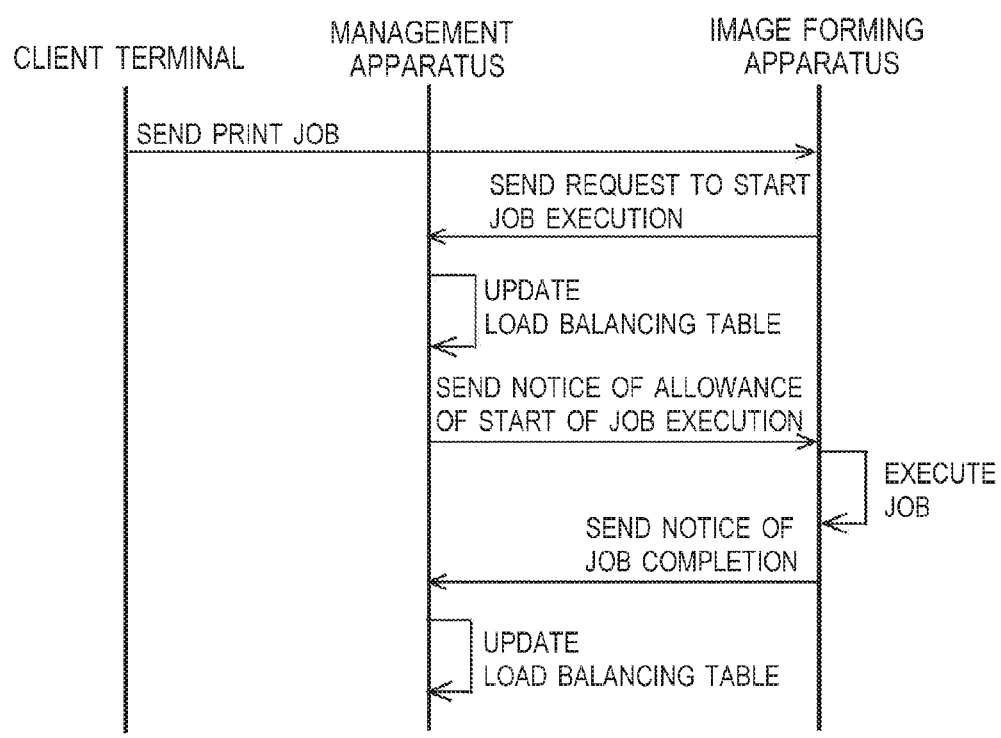
FIG. 16 is a sequence diagram of an example of processing (processing of a print job without the management apparatus) in the network system including image forming apparatuses according to Example 3.
Figure 17:
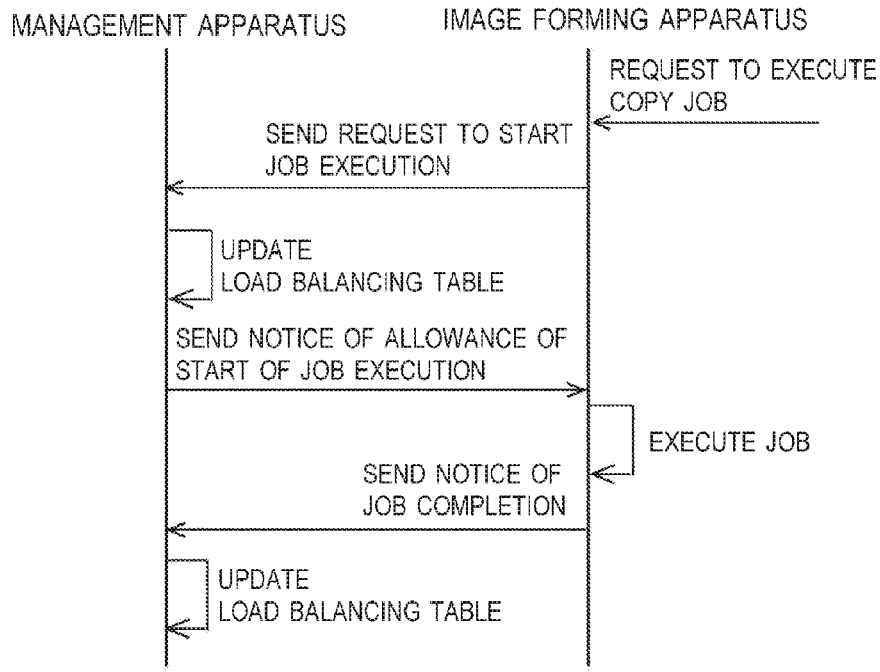
FIG. 17 is a sequence diagram of an example of processing (processing of a copy job) in the network system including image forming apparatuses according to Example 3.
Figure 20:
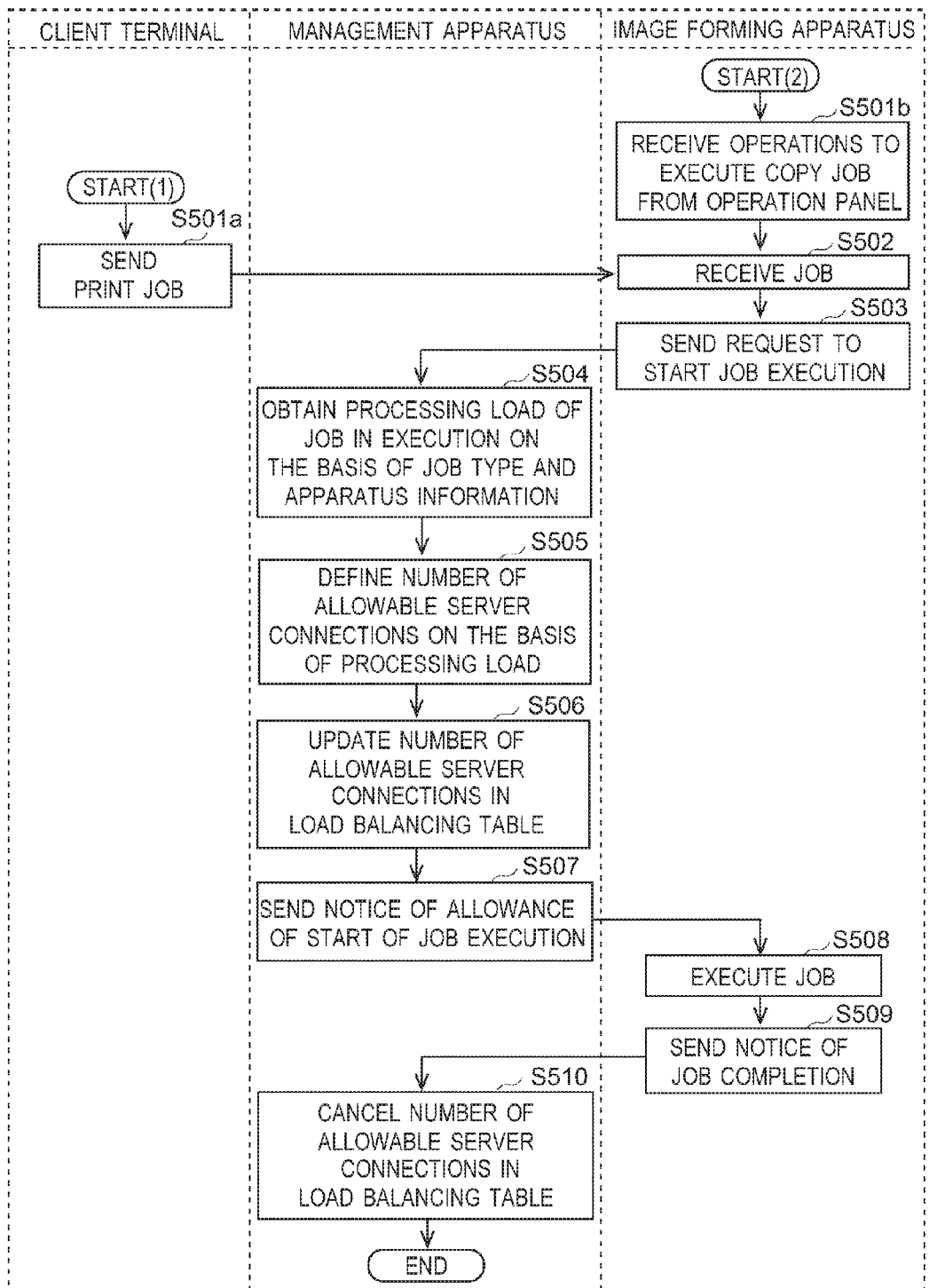
FIG. 20 is a flowchart of an example of operations (processing of a print job without the management apparatus) of the image forming apparatus according to Example 3.

Processing on Direct Reception of a Print Job or Reception of a Copy Job:

As illustrated in the sequence diagrams illustrated in FIGS. 16 and 17, and the flowchart illustrated in FIG. 20, in response that one of client terminals 20 sends a print job directly to one of image forming apparatuses 40 (S501*a*) or that user's operations to instruct to execute a copy job is performed on an operation panel of one of image forming apparatuses 40 (S501*b*), the one of image forming apparatuses 40 receives the job (S502), and sends a request to start job execution to management apparatus 60 before actual execution of the job (S503).

In response to receiving a request to start job execution from one of image forming apparatuses 40, controller 61 (server-connection-number defining section 61*b*) of management apparatus 60 refers to the first table obtained from a specific image forming apparatus 40 from which received the request to start job execution, and obtains a CPU load needed for executing the job (S504), where in the first table, job types and respective processing loads on the common hardware resource are associated with each other. Next, controller 61 (server-connection-number defining section 61*b*) refers to the second table and the threshold value of the processing load obtained from the specific image forming apparatus 40, and defines the number of allowable server connections which can be processed together with the job in parallel on the common hardware resource (S505), where in the second table, the number of server connections and respective processing loads on the common hardware resource are associated with each other. Then, controller 61 (server-connection-number defining section 61*b*) updates the number of server connections to the specific image forming apparatus 40 recorded in the load balancing table by using the allowable server connection number defined (S507).

Figure 21:
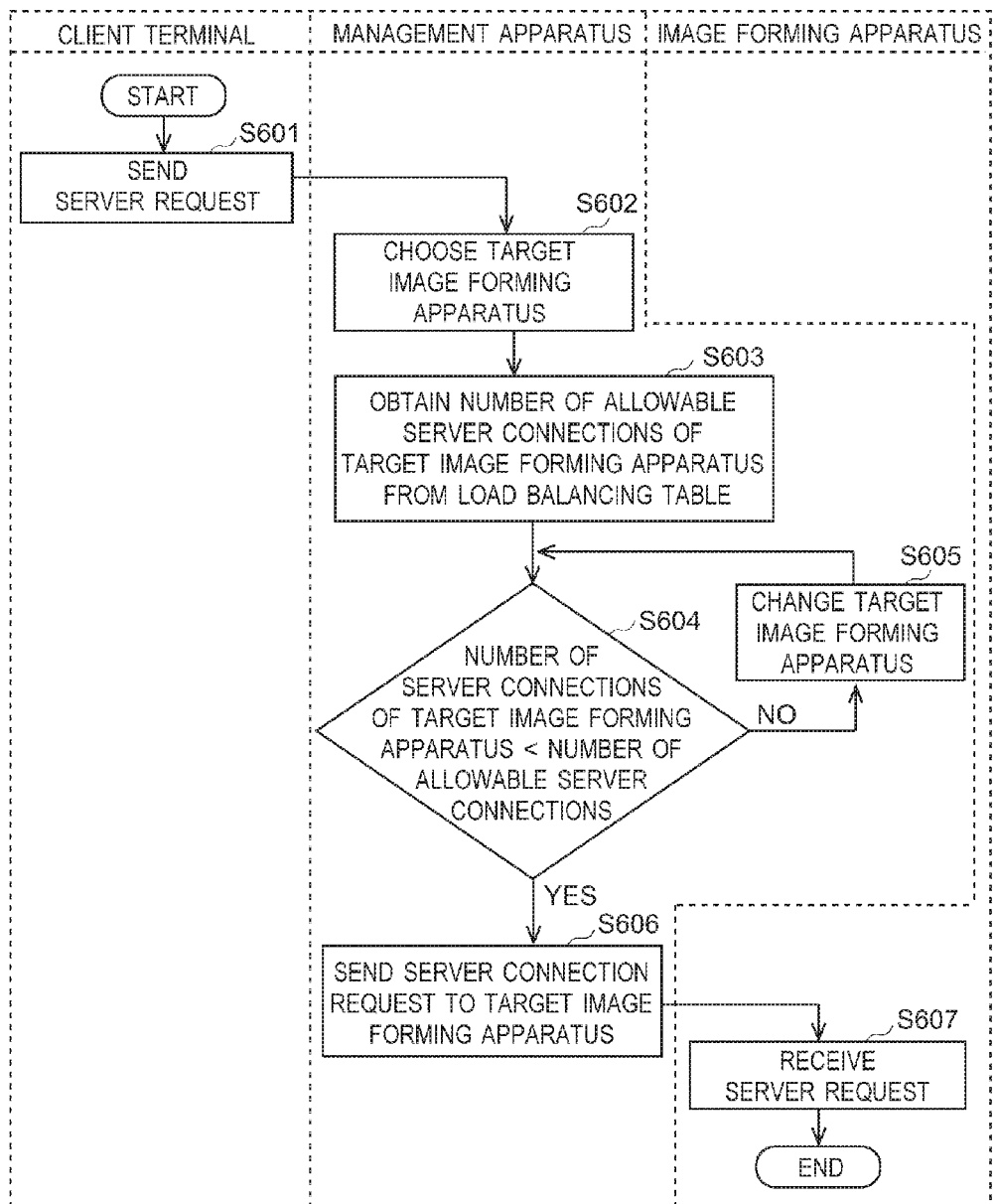
FIG. 21 is a flowchart of an example of operations (processing of a copy job) of the image forming apparatus according to Example 3.

After completion of updating the load balancing table, controller 61 (print-job control section 61*d*) of management apparatus 60 sends a notice of allowance of start of job execution to the specific image forming apparatus 40 (S507). In response to receiving the notice of allowance of start of job execution, the specific image forming apparatus 40 executes the job (S508), and sends a notice of completion of the job to management apparatus 60 after the completion of execution of the job (S509). In response to receiving the notice of completion of the job, controller 61 (server-connection-number defining section 61*b* updates the load balancing table to cancel the number of allowable server connections set into the load balancing table (S510), Processing of Server Load Balancing with Referring to the Load Balancing Table:

As illustrated in the flowchart of FIG. 21, in response that one of client terminals 20 connected to management apparatus 60 through a network sends a request to the server function of one of image forming apparatuses 40 (S601), controller 61 (server-connection control section 61c) of management apparatus 60 receives the request from . the one of client terminals 20 to the server function of the one of image forming apparatuses 40, and choses a connection target among image forming apparatuses 40 (S602). Controller 61 (server-connection control section 61c) of management apparatus 60 refers to the load balancing table and obtains the number of allowable server connections of the target image forming apparatus (S603).

In this process, controller 61 (server-connection control section 61c) confirms whether the number of server connections of the target image forming apparatus is less than the number of allowable server connections (S604). On confirming that the number of server connections of the target image forming apparatus is not less than the number of allowable server connections, controller 61 (server-connection control section 61c) changes the connection target to another of image forming apparatuses 40 (S605), and performs the same confirmation on the another of image forming apparatuses 40. On confirming that the number of server connections of the target image forming apparatus is less than the number of allowable server connections, controller 61 (server-connection control section 61c) sends a request of server connection to the target image forming apparatus (S606). The target image forming apparatus 40 receives the request and offers services of the server function to one of the client terminal as a request sender (S607).

By repeating the above-described processing of server load balancing, management apparatus 60 can receive all of requests to the server functions of image forming apparatuses 40 from client terminals 20 connected to the management apparatus 60 through a network, and distribute the requests across the image forming apparatuses 40 so that the number of server connections of each of the image forming apparatuses 40 does not exceed the respective number of allowable server connections set in the load balancing table.

As described above, management apparatus 60 controls each of image forming apparatuses 40 so that the number of server connections during execution of a job does not exceed the number of allowable server connections that can be processed together with the job in parallel on the common hardware resource. Such control can secure the performance and reliability of job execution in each of image forming apparatuses 40.

The present invention should not be limited to the description in the above embodiments and examples, and its constitution and control can be modified appropriately unless the modification deviates from the intention of the present invention.

For example, Examples 1 and 2 employ the following processing as judgement whether to start job execution in each image forming apparatus. That is, the processing includes, on judging that the number of current server connections is not less than the number of allowable server connections that can be processed together with the job in parallel, executing the job in a low-speed mode, or transferring session information of a part of the server function of one of image forming apparatuses to the corresponding server function of another image forming apparatus. Example 3 may also employ the similar judgement whether to start job execution in each of image forming apparatuses.

Further, Examples 1 to 3 showed a load on a CPU as an example of a processing load on a common hardware resource. The common hardware resource is not limited to a CPU. For example, server access (server connections) may be restricted on the basis of a load on a memory (the amount of consumption of a memory area) or a load on a bus (the amount of data to be input and output by a bus).

The present invention is applicable to a network system including image forming apparatuses each providing a server function, a load control program for balancing a processing load of the server functions of the image forming apparatuses, a non-transitory computer-readable storage medium storing the load control program, and a load control method.

The invention claimed is:

1. An image forming apparatus capable of communicating with one or more client terminals and a load balancing apparatus through a network, the image forming apparatus comprising:
   a network interface unit; and
   a controller that
      provides a job execution function to execute a job and a server function to receive data from the network or output data to the network through the network interface unit,
      defines a condition for restricting server connections from the one or more client terminals to use the server function, in accordance with a status of job execution, and
      instructs the load balancing apparatus to perform load control to restrict the server connections from the one or more client terminals on a basis of the condition defined.

2. The image forming apparatus of claim 1, comprising
   a common hardware resource to be used to provide the job execution function and the server function,
   a first table in which job types and respective processing loads on the common hardware resource are associated with each other, and
   a second table in which numbers of server connections to use the server function and respective processing loads on the common hardware resource are associated with each other,
   wherein the controller includes
      a load determining section that determines a processing load of a job in execution on the common hardware resource, by referring to the first table,
      a server-connection-number defining section that defines a number of allowable server connections indicating a number of server connections to use the server function which can be processed together with the job in parallel, by referring to the second table, and
      an instruction section that instructs the load balancing apparatus to perform the load control based on the number of allowable server connections.

3. The image forming apparatus of claim 2,
   wherein the controller further includes an operation control section that
      judges whether a number of current server connections to use the server function is less than the number of allowable server connections,
      on judging that the number of current server connections is less than the number of allowable server connections, executes the job in a normal mode, and
      on judging that the number of current server connections is not less than the number of allowable server connections, executes the job in another mode in which a processing load of a job on the common hardware resource is smaller than a processing load of the job on the common hardware resource in the normal mode.

4. The image forming apparatus of claim 3, wherein the instruction section, on judging that the number of current server connections is not less than the number of allowable server connections, instructs the load balancing apparatus to change a destination of one or more requests which were sent to the server function from at least one of the one or more client terminals, to another image forming apparatus which provides a same type of server function as the server function of the image forming apparatus.

5. The image forming apparatus of claim 4, wherein the instruction section, on judging that the number of current server connections is not less than the number of allowable server connections, instructs the load balancing apparatus to transfer session information kept by the server function to the another image forming apparatus.

6. A management apparatus capable of communicating through a network with one or more client terminals and a plurality of image forming apparatuses each providing a job execution function to execute a job and a server function to receive data from the network or output data to the network through a network interface unit of the each of the image forming apparatuses, the management apparatus comprising:
a network interface unit; and
a controller that
receives a request sent from the client terminal to the server function of one of the plurality of image forming apparatuses and sends the request to one of the plurality of image forming apparatuses, through the network interface unit,
obtains, from each of the plurality of image forming apparatuses, information relating to a status of job execution of the each of the plurality of image forming apparatuses, and
in accordance with the status of job execution of the each of the plurality of image forming apparatuses, performs load control to restrict server connections from the one or more client terminals to use the server function of each of the plurality of image forming apparatuses.

7. The management apparatus of claim 6, wherein each of the image forming apparatuses includes
a common hardware resource to be used to provide the job processing function and the server function, and
the controller includes
an apparatus-information obtaining section that obtains, from each of the plurality of image forming apparatuses, apparatus information including
a first table in which job types and respective processing loads on the common hardware resource are associated with each other, and
a second table in which numbers of server connections and respective processing loads on the common hardware resource are associated with each other,
a server-connection-number defining section that determines a processing load of a job in execution on the common hardware resource in each of the plurality of image forming apparatuses, by referring to the first table, and defines a number of allowable server connections indicating a number of server connections to use the server function which can be processed together with the job in parallel in each of the plurality of image forming apparatuses, by referring to the second table, and
a server-connection control section that performs the load control based on the number of allowable server connections of each of the plurality of image forming apparatuses.

8. The management apparatus of claim 7, comprising
a table to which a plurality of image forming apparatuses can be registered,
wherein the server-connection control section chooses a destination of the request among the plurality of image forming apparatuses registered in the table.

9. A non-transitory computer-readable storage medium storing a load control program to be executed in an image forming apparatus capable of communicating with one or more client terminals and a load balancing apparatus through a network, the image forming apparatus providing a job execution function to execute a job and a server function to receive data from the network or output data to the network through a network interface unit, the load control program, when being executed by a processor of the image forming apparatus, causing the image forming apparatus to perform processing comprising:
defining a condition for restricting server connections from the one or more client terminals to use the server function, in accordance with a status of job execution; and
instructing the load balancing apparatus to perform load control to restrict the server connections from the one or more client terminals on a basis of the condition defined.

10. The non-transitory computer-readable storage medium of claim 9,
wherein the image forming apparatus includes
a common hardware resource to be used to provide the job execution function and the server function,
a first table in which job types and respective processing loads on the common hardware resource are associated with each other, and
a second table in which numbers of server connections to use the server function and respective processing loads on the common hardware resource are associated with each other, and
the processing further comprises
determining a processing load of a job in execution on the common hardware resource, by referring to the first table;
defining a number of allowable server connections indicating a number of server connections to use the server function which can be processed together with the job in parallel, by referring to the second table; and
instructing the load balancing apparatus to perform the load control based on the number of allowable server connections.

11. The non-transitory computer-readable storage medium of claim 10,
wherein the processing further comprises
judging whether a number of current server connections to use the server function is less than the number of allowable server connections;

on judging that the number of current server connections is less than the number of allowable server connections, executing the job in a normal mode; and on judging that the number of current server connections is not less than the number of allowable server connections, executing the job in another mode in which a processing load of a job on the common hardware resource is smaller than a processing load of the job on the common hardware resource in the normal mode.

12. The non-transitory computer-readable storage medium of claim
wherein the instructing the load balancing apparatus includes,
on judging that the number of current server connections is not less than the number of allowable server connections, instructing the load balancing apparatus to change a destination of one or more requests which were sent to the server function from at least one of the one or more client terminals, to another image forming apparatus which provides a same type of server function as the server function of the image forming apparatus.

13. The non-transitory computer-readable storage medium of claim 12,
wherein the instructing the load balancing apparatus includes,
on judging that the number of current server connections is not less than the number of allowable server connections, instructing the load balancing apparatus to transfer session information kept by the server function to the another image forming apparatus.

14. A non-transitory computer-readable storage medium storing a load control program to be executed in a management apparatus capable of communicating through a network with one or more client terminals and a plurality of image forming apparatuses each providing a job execution function to execute a job and a server function to receive data from the network or output data to the network through a network interface unit of the each of the image forming apparatuses, the management apparatus receiving a request sent from the client terminal to the server function of one of the plurality of image forming apparatuses and sending the request to the one of the plurality of image forming apparatuses, the load control program, when being executed by a processor of the management apparatus, causing the management apparatus to perform processing comprising:
obtaining, from each of the plurality of image forming apparatuses, information relating to a status of job execution of the each of the plurality of image forming apparatuses; and
in accordance with the status of job execution of the each of the plurality of image forming apparatuses, performing load control to restrict server connections from the one or more client terminals to use the server function of each of the plurality of image forming apparatuses.

15. The non-transitory computer-readable storage medium of claim 14,
wherein each of the image forming apparatuses includes a common hardware resource to be used to provide the job processing function and the server function, and
the processing further comprises
obtaining, from each of the plurality of image forming apparatuses, apparatus information including
a first table in which job types and respective processing loads on the common hardware resource are associated with each other, and
a second table in which numbers of server connections and respective processing loads on the common hardware resource are associated with each other;
determining a processing load of a job in execution on the common hardware resource in each of the plurality of image forming apparatuses, by referring to the first table, and defining a number of allowable server connections indicating a number of server connections to use the server function which can be processed together with the job in parallel in each of the plurality of image forming apparatuses, by referring to the second table; and
performing the load control based on the number of allowable server connections of each of the plurality of image forming apparatuses.

16. The non-transitory computer-readable storage medium of claim 15,
wherein the management apparatus comprises a table to which a plurality of image forming apparatuses can be registered, and
the performing the load control includes choosing a destination of the request among the plurality of image forming apparatuses registered in the table.

17. A load control method to be used in a system including one or more client terminals, a load balancing apparatus and an image forming apparatuses being capable of communicating with each other through a network, the image forming apparatus providing a job execution function to execute a job and a server function to receive data from the network or output data to the network through a network interface unit, the method comprising:
defining, by the image forming apparatus, a condition for restricting server connections from the one or more client terminals to use the server function, in accordance with a status of job execution; and
instructing, by the image forming apparatus, the load balancing apparatus to perform load control to restrict the server connections from the one or more client terminals on a basis of the condition defined.

18. A load control method to be used in a system including one or more client terminals, a management apparatus and a plurality of image forming apparatuses being capable of communicating with each other through a network, the plurality of image forming apparatuses each providing a job execution function to execute a job and a server function to receive data from the network or output data to the network through a network interface unit, the management apparatus receiving a request sent from the client terminal to the server function of one of the plurality of image forming apparatuses and sending the request to the one of the plurality of image forming apparatuses, the method comprising:
obtaining, by the management apparatus from each of the plurality of image forming apparatuses, information relating to a status of job execution of the each of the plurality of image forming apparatuses; and
in accordance with the status of job execution in the each of the plurality of image forming apparatuses, performing by the management apparatus, load control to restrict server connections from the one or more client terminals to use the server function of each of the plurality of image forming apparatuses.

* * * * *